(12) United States Patent
Danner et al.

(10) Patent No.: US 8,049,947 B2
(45) Date of Patent: Nov. 1, 2011

(54) COMPONENTS AND METHODS FOR USE IN ELECTRO-OPTIC DISPLAYS

(75) Inventors: Guy M. Danner, Somerville, MA (US); Valerie C. Northrop, Waltham, MA (US); Jonathan L. Zalesky, Watertown, MA (US); Matthew Joseph Kayal, Franklin, MA (US); Steven J. O'Neil, Pembroke, MA (US)

(73) Assignee: E Ink Corporation, Cambridge, MA (US)

( * ) Notice: Subject to any disclaimer, the term of this patent is extended or adjusted under 35 U.S.C. 154(b) by 274 days.

(21) Appl. No.: 12/550,470

(22) Filed: Aug. 31, 2009

(65) Prior Publication Data

US 2010/0165446 A1 Jul. 1, 2010

Related U.S. Application Data

(60) Continuation-in-part of application No. 11/850,831, filed on Sep. 6, 2007, now Pat. No. 7,583,427, which is a continuation-in-part of application No. 11/426,077, filed on Jun. 23, 2006, now Pat. No. 7,554,712, which is a continuation-in-part of application No. 11/747,546, filed on May 11, 2007, now Pat. No. 7,443,571, which is a continuation of application No. 10/907,065, filed on Mar. 18, 2005, now Pat. No. 7,236,292, which is a division of application No. 10/249,957, filed on May 22, 2003, now Pat. No. 6,982,178.

(60) Provisional application No. 60/320,186, filed on May 12, 2003, provisional application No. 60/595,957, filed on Aug. 19, 2005, provisional application No. 60/595,332, filed on Jun. 23, 2005, provisional application No. 60/826,258, filed on Sep. 20, 2006, provisional application No. 60/319,300, filed on Jun. 10, 2002.

(51) Int. Cl.
*G02F 1/03* (2006.01)

(52) U.S. Cl. ........................................ 359/254; 359/245

(58) Field of Classification Search .................. 359/245, 359/254, 265, 273, 296
See application file for complete search history.

(56) References Cited

U.S. PATENT DOCUMENTS 3,391,014 A 7/1968 Fauser
(Continued)

FOREIGN PATENT DOCUMENTS
EP 1 099 207 B1 3/2002
(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — William C Choi
(74) *Attorney, Agent, or Firm* — David J. Cole

(57) ABSTRACT

A display assembly comprises a backplane assembly comprising a plurality of spaced backplane areas, each backplane area comprising a plurality of electrodes, the backplane areas being separated by gutter areas free from electrodes; an adhesive layer overlying the plurality of spaced backplane areas; and a layer of a solid electro-optic medium overlying the adhesive layer in the plurality of spaced backplane areas. The display sub-assembly can be produced via a single lamination and severed to form a plurality of separate electro-optic displays. Processes for producing the display assembly are also described.

25 Claims, 12 Drawing Sheets

U.S. PATENT DOCUMENTS

| | | | |
|---|---|---|---|
| 3,668,106 A | 6/1972 | Ota |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris, Jr. et al. |
| 4,093,534 A | 6/1978 | Carter et al. |
| 4,160,257 A | 7/1979 | Carrish |
| 4,272,596 A | 6/1981 | Harbour et al. |
| 4,418,346 A | 11/1983 | Batchelder |
| 4,522,472 A | 6/1985 | Liebert et al. |
| 4,550,982 A | 11/1985 | Hirai |
| 4,602,263 A | 7/1986 | Borror et al. |
| 4,655,897 A | 4/1987 | DiSanto et al. |
| 4,681,403 A | 7/1987 | Te Velde et al. |
| 4,703,573 A | 11/1987 | Montgomery et al. |
| 4,742,345 A | 5/1988 | Di Santo et al. |
| 4,746,917 A | 5/1988 | Di Santo et al. |
| 4,902,108 A | 2/1990 | Byker |
| 5,250,938 A | 10/1993 | DiSanto et al. |
| 5,276,438 A | 1/1994 | DiSanto et al. |
| 5,288,433 A | 2/1994 | Stevens |
| 5,293,528 A | 3/1994 | DiSanto et al. |
| 5,378,404 A | 1/1995 | Han et al. |
| 5,402,145 A | 3/1995 | Disanto et al. |
| 5,412,398 A | 5/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,548,282 A | 8/1996 | Escritt et al. |
| 5,561,443 A | 10/1996 | Disanto et al. |
| 5,745,094 A | 4/1998 | Gordon, II et al. |
| 5,760,761 A | 6/1998 | Sheridon |
| 5,777,782 A | 7/1998 | Sheridon |
| 5,800,950 A | 9/1998 | Hirao et al. |
| 5,808,783 A | 9/1998 | Crowley |
| 5,825,526 A | 10/1998 | Bommarito et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,105,290 A | 8/2000 | Coates et al. |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,151,153 A | 11/2000 | Bryan |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,204,953 B1 | 3/2001 | Zieba et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,337,761 B1 | 1/2002 | Rogers et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,400,492 B1 | 6/2002 | Morita et al. |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,661,563 B2 | 12/2003 | Hayashi et al. |
| 6,664,944 B1 | 12/2003 | Albert et al. |
| 6,671,030 B2 | 12/2003 | Gyoda |
| D485,294 S | 1/2004 | Albert |
| 6,672,921 B1 | 1/2004 | Liang et al. |
| 6,680,517 B2 | 1/2004 | Namba |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,723,392 B1 | 4/2004 | Jinnai et al. |
| 6,724,519 B1 | 4/2004 | Morrison et al. |
| 6,727,881 B1 | 4/2004 | Albert et al. |
| 6,731,367 B1 | 5/2004 | Saitoh |
| 6,738,050 B2 | 5/2004 | Comiskey et al. |
| 6,750,473 B2 | 6/2004 | Amundson et al. |
| 6,750,844 B2 | 6/2004 | Nakanishi |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Pratt et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,845,184 B1 | 1/2005 | Yoshimura et al. |
| 6,859,247 B2 | 2/2005 | Murade et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,891,672 B2 | 5/2005 | Whitehead et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |

| | | | |
|---|---|---|---|
| 6,995,550 B2 | 2/2006 | Jacobson et al. | |
| 7,002,728 B2 | 2/2006 | Pullen et al. | |
| 7,012,583 B2 | 3/2006 | Toro-Lira et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,759 B2 | 10/2006 | Zehner et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 | 2/2007 | Doshi et al. | |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,312,916 B2 | 12/2007 | Pullen et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,349,148 B2 | 3/2008 | Doshi et al. | |
| 7,352,353 B2 | 4/2008 | Albert et al. | |
| 7,365,394 B2 | 4/2008 | Denis et al. | |
| 7,365,733 B2 | 4/2008 | Duthaler et al. | |
| 7,375,875 B2 | 5/2008 | Whitesides et al. | |
| 7,382,363 B2 | 6/2008 | Albert et al. | |
| 7,388,572 B2 | 6/2008 | Duthaler et al. | |
| 7,391,555 B2 | 6/2008 | Albert et al. | |
| 7,411,719 B2 | 8/2008 | Paolini, Jr. et al. | |
| 7,411,720 B2 | 8/2008 | Honeyman et al. | |
| 7,420,549 B2 | 9/2008 | Jacobson et al. | |
| 7,442,587 B2 | 10/2008 | Amundson et al. | |
| 7,443,571 B2 | 10/2008 | LeCain et al. | |
| 7,453,445 B2 | 11/2008 | Amundson | |
| 2001/0046399 A1 | 11/2001 | Hayashi et al. | |
| 2002/0060321 A1 | 5/2002 | Kazlas et al. | |
| 2002/0061451 A1 | 5/2002 | Kita et al. | |
| 2002/0090980 A1 | 7/2002 | Wilcox et al. | |
| 2002/0106874 A1 | 8/2002 | Iwane et al. | |
| 2003/0102858 A1 | 6/2003 | Jacobson et al. | |
| 2003/0179436 A1 | 9/2003 | Liang et al. | |
| 2004/0097054 A1 | 5/2004 | Abe | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0155857 A1 | 8/2004 | Duthaler et al. | |
| 2004/0180476 A1 * | 9/2004 | Kazlas et al. | 438/146 |
| 2004/0190114 A1 | 9/2004 | Jacobson et al. | |
| 2004/0263947 A1 | 12/2004 | Drzaic et al. | |
| 2005/0001810 A1 | 1/2005 | Yakushiji et al. | |
| 2005/0007336 A1 | 1/2005 | Albert et al. | |
| 2005/0012980 A1 | 1/2005 | Wilcox et al. | |
| 2005/0018273 A1 | 1/2005 | Honeyman et al. | |
| 2005/0024353 A1 | 2/2005 | Amundson et al. | |
| 2005/0062714 A1 | 3/2005 | Zehner et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0152018 A1 | 7/2005 | Abramson et al. | |
| 2005/0156340 A1 | 7/2005 | Valianatos et al. | |
| 2005/0179642 A1 | 8/2005 | Wilcox et al. | |
| 2005/0212747 A1 | 9/2005 | Amundson | |
| 2005/0214963 A1 | 9/2005 | Daniels | |
| 2005/0253777 A1 | 11/2005 | Zehner et al. | |
| 2005/0259068 A1 | 11/2005 | Nihei et al. | |
| 2005/0270261 A1 | 12/2005 | Danner et al. | |
| 2005/0280626 A1 | 12/2005 | Amundson et al. | |
| 2006/0038772 A1 | 2/2006 | Amundson et al. | |
| 2006/0087479 A1 | 4/2006 | Sakurai et al. | |
| 2006/0087489 A1 | 4/2006 | Sakurai et al. | |
| 2006/0087718 A1 | 4/2006 | Takagi et al. | |
| 2006/0139308 A1 | 6/2006 | Jacobson et al. | |
| 2006/0139310 A1 | 6/2006 | Zehner et al. | |
| 2006/0139311 A1 | 6/2006 | Zehner et al. | |
| 2006/0176267 A1 | 8/2006 | Honeyman et al. | |
| 2006/0181492 A1 | 8/2006 | Gates et al. | |
| 2006/0181504 A1 | 8/2006 | Kawai | |
| 2006/0194619 A1 | 8/2006 | Wilcox et al. | |
| 2006/0197737 A1 | 9/2006 | Baucom et al. | |
| 2006/0197738 A1 | 9/2006 | Kawai | |
| 2006/0202949 A1 | 9/2006 | Danner et al. | |
| 2006/0209008 A1 | 9/2006 | Nihei et al. | |
| 2006/0214906 A1 | 9/2006 | Kobayashi et al. | |
| 2006/0231401 A1 | 10/2006 | Sakurai et al. | |
| 2006/0232531 A1 | 10/2006 | Amundson et al. | |
| 2006/0238488 A1 | 10/2006 | Nihei et al. | |
| 2006/0263927 A1 | 11/2006 | Sakurai et al. | |
| 2006/0279527 A1 | 12/2006 | Zehner et al. | |
| 2006/0291034 A1 | 12/2006 | Patry et al. | |
| 2007/0013683 A1 | 1/2007 | Zhou et al. | |
| 2007/0035532 A1 | 2/2007 | Amundson et al. | |
| 2007/0035808 A1 | 2/2007 | Amundson et al. | |
| 2007/0052757 A1 | 3/2007 | Jacobson | |
| 2007/0057908 A1 | 3/2007 | Jacobson | |
| 2007/0069247 A1 | 3/2007 | Amundson et al. | |
| 2007/0085818 A1 | 4/2007 | Amundson et al. | |
| 2007/0091417 A1 | 4/2007 | Cao et al. | |
| 2007/0091418 A1 | 4/2007 | Danner et al. | |
| 2007/0097489 A1 | 5/2007 | Doshi et al. | |
| 2007/0103427 A1 | 5/2007 | Zhou et al. | |
| 2007/0109219 A1 | 5/2007 | Whitesides et al. | |
| 2007/0146310 A1 | 6/2007 | Paolini et al. | |
| 2007/0152956 A1 | 7/2007 | Danner et al. | |
| 2007/0153361 A1 | 7/2007 | Danner et al. | |
| 2007/0200795 A1 | 8/2007 | Whitesides et al. | |
| 2007/0200874 A1 | 8/2007 | Amundson et al. | |
| 2007/0211002 A1 | 9/2007 | Zehner et al. | |
| 2007/0211331 A1 | 9/2007 | Danner et al. | |
| 2007/0223079 A1 | 9/2007 | Honeyman et al. | |
| 2007/0247697 A1 | 10/2007 | Sohn et al. | |
| 2007/0285385 A1 | 12/2007 | Albert et al. | |
| 2007/0286975 A1 | 12/2007 | Fazel et al. | |
| 2007/0296452 A1 | 12/2007 | Kang et al. | |
| 2008/0013155 A1 | 1/2008 | Honeyman et al. | |
| 2008/0013156 A1 | 1/2008 | Whitesides et al. | |
| 2008/0023332 A1 | 1/2008 | Webber et al. | |
| 2008/0024429 A1 | 1/2008 | Zehner | |
| 2008/0024482 A1 | 1/2008 | Gates et al. | |
| 2008/0030832 A1 | 2/2008 | Paolini et al. | |
| 2008/0048969 A1 | 2/2008 | Whitesides et al. | |
| 2008/0074730 A1 | 3/2008 | Cao et al. | |
| 2008/0117495 A1 | 5/2008 | Arango et al. | |

FOREIGN PATENT DOCUMENTS

| | | |
|---|---|---|
| EP | 1 145 072 B1 | 5/2003 |
| JP | 62-269124 A | 11/1987 |
| JP | 64-086116 | 3/1989 |
| JP | 01-267525 A | 10/1989 |
| JP | 02-284125 A | 11/1990 |
| JP | 03-168613 | 7/1991 |
| JP | 08-278491 | 10/1996 |
| JP | 10-149118 A | 6/1998 |
| JP | 2002-098945 | 4/2002 |
| WO | WO 82/02961 | 9/1982 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 01/92359 | 12/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDA'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Croucher, M.D., et al., "Electrophoretic Display: Materials as Related to Performance", Photog. Sci. Eng., 25, 80 (1981).

Dalisa, A.L., "Electrophoretic Display Technology", IEEE Trans. Electron Dev., ED-24, 827 (1977).

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Gutcho, M.H., Microcapsules and Microencapsulation Techniques, Noyes Data Corp., Park Ridge NJ, (1976).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDA '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Ota, I., et al., "Developments in Electrophoretic Displays", Proceedings of the SID, 18, 243 (1977).

Pitt, M.G., et al., "Power Consumption of Microencapsulated Electrophoretic Displays for Smart Handheld Applications", SID 02 Digest, 1378 (2002).

Shiwa, S., et al., "Electrophoretic Display Method Using Ionographic Technology," SID 88 Digest (1988), p. 61.

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDA '01, p. 1729, Paper AMD4-4 (2001).

Zehner, R. et al., "Drive Waveforms for Active Matrix Electrophoretic Displays", SID 03 Digest, 842 (2003).

* cited by examiner

COMPONENTS AND METHODS FOR USE IN ELECTRO-OPTIC DISPLAYS

REFERENCE TO RELATED APPLICATIONS

This application is a continuation-in-part of copending application Ser. No. 11/850,831, filed Sep. 6, 2007 (Publication No. 2008/057252), which claims benefit of copending Application Ser. No. 60/826,258, filed Sep. 20, 2006. The aforementioned application Ser. No. 11/850,831 is also a continuation-in-part of application Ser. No. 11/426,077, filed Jun. 23, 2006 (Publication No. 2006/0291034, now U.S. Pat. No. 7,554,712, issued Jun. 30, 2009), which claims benefit of Application Ser. No. 60/595,332, filed Jun. 23, 2005, and of Application Ser. No. 60/595,957, filed Aug. 19, 2005. The aforementioned application Ser. No. 11/850,831 is also a continuation-in-part of application Ser. No. 11/747,546, filed May 11, 2007 (now U.S. Pat. No. 7,443,571, issued Oct. 28, 2008), which is a continuation of application Ser. No. 10/907,065, filed Mar. 18, 2005 (now U.S. Pat. No. 7,236,292), which is a divisional of application Ser. No. 10/249,957, filed May 22, 2003 (now U.S. Pat. No. 6,982,178), which claims benefit of Application Ser. No. 60/319,300, filed Jun. 10, 2002, and Application Ser. No. 60/320,186, filed May 12, 2003.

This application is also related to:
  (a) copending application Ser. No. 10/605,024, filed Sep. 2, 2003 (Publication No. 2004/0155857);
  (b) application Ser. No. 10/904,063, filed Oct. 21, 2004 (now U.S. Pat. No. 7,110,164), which is a continuation-in-part of the aforementioned application Ser. No. 10/605,024;
  (c) application Ser. No. 11/307,297, filed Jan. 31, 2006, which is a divisional of the aforementioned application Ser. No. 10/904,063;
  (d) copending application Ser. No. 11/550,114, filed Oct. 17, 2006 (Publication No. 2007/0109219) and claiming benefit of Application Ser. No. 60/596,743, filed Oct. 18, 2005 and of Application Ser. No. 60/596,799, filed Oct. 21, 2005;
  (e) copending application Ser. No. 11/612,732, filed Dec. 19, 2006 (Publication No. 2007/0152956) and claiming benefit of Application Ser. No. 60/597,801, filed Dec. 20, 2005;
  (f) copending application Ser. No. 11/682,409, filed Mar. 6, 2007 and claiming benefit of Application Ser. No. 60/767,171, filed Mar. 8, 2006; and
  (g) copending application Ser. No. 11/561,536, filed Nov. 20, 2006 (Publication No. 2007/0153361) and claiming benefit of Application Ser. No. 60/597,279, filed Nov. 21, 2005, and of Application Ser. No. 60/744,022, filed Mar. 31, 2006.

The entire contents of these copending applications, and of all other U.S. patents and published and copending applications mentioned below, are herein incorporated by reference. For convenience, the foregoing applications and patents may hereinafter be referred to as the "electro-optic display manufacturing" or "EODM" patents and applications.

BACKGROUND OF INVENTION

This invention relates to components and methods for use in electro-optic displays. More specifically, this invention relates to methods for the manufacture of electro-optic displays, and to certain sub-assemblies produced during such methods. This invention primarily relates to such methods and sub-assemblies for forming electro-optic displays containing an electro-optic medium which is a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays, encapsulated liquid crystal displays, and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in an article in the Sep. 25, 2003 issue of the Journal "Nature" and entitled "Performing Pixels: Moving Images on Electronic Paper", Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; and 7,236,792; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Patent Publication No. 2004/0226820); and other similar techniques.) Thus, the resulting display can be flexible. Further, because the display medium can be printed (using a variety of methods), the display itself can be made inexpensively.

Other types of electro-optic media, for example encapsulated liquid crystal media, may also be used in the methods of the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in electrophoretic displays, and the methods used to manufacture such displays, are derived from technology used in liquid crystal displays (LCD's). For example, electrophoretic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with encapsulated electrophoretic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

As discussed in the aforementioned U.S. Pat. No. 6,312,304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the electro-optic medium chemically or by causing mechanical damage.

This U.S. Pat. No. 6,312,304 describes a method of manufacturing an electro-optic display comprising providing a modulating layer including a first substrate and an electro-optic material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optic display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

Electro-optic displays manufactured using the aforementioned front plane laminates or double release films normally have a layer of lamination adhesive between the electro-optic layer itself and the backplane, and the presence of this lamination adhesive layer affects the electro-optic characteristics of the displays. In particular, the electrical conductivity of the lamination adhesive layer affects both the low temperature performance and the resolution of the display. The low temperature performance of the display can (it has been found empirically) be improved by increasing the conductivity of the lamination adhesive layer, for example by doping the layer with tetrabutylammonium hexafluorophosphate or other materials as described in the aforementioned U.S. Pat. No. 7,012,735 and Publication No. 2005/0122565. However, increasing the conductivity of the lamination adhesive layer in this manner tends to increase pixel blooming (a phenomenon whereby the area of the electro-optic layer which changes optical state in response to change of voltage at a pixel electrode is larger than the pixel electrode itself), and this blooming tends to reduce the resolution of the display. Hence, this type of display apparently intrinsically requires a compromise between low temperature performance and display resolution, and in practice it is usually the low temperature performance which is sacrificed.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

However, a number of problems remain in the large scale manufacture of electro-optic displays. The lamination processes involved are relatively slow and hence labor intensive, so that in practice, at least for low cost displays, it is necessary to use "multi-up" methods which laminate a plurality of displays in a single operation, with the individual displays being separated from each other at a later stage in the process. To allow for proper separation, gaps ("gutters") must be left between adjacent displays. If the electro-optic medium is coated as a continuous film over a substrate, the electro-optic medium within the gutters is wasted, since it is not used in any of the final displays. Since the electro-optic medium can be expensive, such waste is a serious problem, especially when the individual displays are small, as for example electro-optic displays used on flash drives. For example, lamination of small displays may result in only about 20 percent of the electro-optic medium being incorporated into the final displays, the remaining 80 percent or so being wasted. If electro-optic medium is not to be wasted in the gutters, it is necessary to hold discrete pieces of electro-optic medium (and any other layers attached thereto prior to the lamination) accurately spaced from one another so that these discrete pieces can be laminated to other components of the final display.

The present invention provides methods for the production of electro-optic displays which reduce or eliminate the aforementioned problems. The present invention also provides certain sub-assemblies useful in such methods.

SUMMARY OF THE INVENTION

In one aspect, this invention provides a (first) sub-assembly for use in forming an electro-optic display, the sub-assembly comprising:
a light-transmissive substrate;
a plurality of discrete areas of an electro-optic material disposed on the substrate, the discrete areas being separated from each other by gutter areas essentially free from the electro-optic material; and
on the opposed side of the areas of electro-optic material from the substrate, at least one of an adhesive layer and a release layer peelable from the sub-assembly without substantial damage thereto.

This first sub-assembly of the present invention may have an adhesive layer in contact with the areas of electro-optic material and a release layer on the opposed side of the adhesive layer from the electro-optic material. The adhesive layer and/or release layer may or may not extend across the gutter areas. The substrate may comprise a light-transmissive electrically-conductive layer. The first sub-assembly may further comprise a removable masking film disposed on the opposed side of the substrate from the electro-optic material. Alternatively or in addition, the first sub-assembly may further comprise a substrate adhesive layer disposed between the areas of electro-optic material and the substrate, with the gutter areas being essentially free from the substrate adhesive layer.

This invention also provides a (second) sub-assembly for use in forming an electro-optic display, the sub-assembly comprising:
a release sheet;
a plurality of discrete areas of an electro-optic material disposed on the substrate, the discrete areas being separated from each other by gutter areas essentially free from the electro-optic material,
the release sheet being peelable from the electro-optic material without substantial damage thereto; and
on the opposed side of the areas of electro-optic material from the substrate, at least one of an adhesive layer and a release layer, the release layer being peelable from the electro-optic material or adhesive layer with which it is in contact without substantial damage thereto.

This second sub-assembly of the present invention may have an adhesive layer in contact with the areas of electro-optic material and a release layer on the opposed side of the adhesive layer from the electro-optic material. The adhesive and the release layer may or may not extend across the gutter areas, although the latter is generally preferred.

Both the first and second sub-assemblies of the present invention may make use of any of the types of solid electro-optic materials discussed above. Thus, for example, either type of sub-assembly may comprise a rotating bichromal member or electrochromic material. Alternatively, either type of sub-assembly may comprise an electrophoretic material comprising a plurality of electrically charged particles disposed in a fluid and capable of moving through the fluid under the influence of an electric field. The electrically charged particles and the fluid are confined within a plurality of capsules or microcells. Alternatively, the electrically charged particles and the fluid may be present as a plurality of discrete droplets surrounded by a continuous phase comprising a polymeric material. The fluid may be liquid or gaseous.

In another aspect, this invention provides a (first) process for forming a first sub-assembly of the present invention, this first process comprising:

- forming a plurality of components, each component comprising a layer of electro-optic material and a release layer peelable from the layer of electro-optic material without substantial damage thereto;
- disposing the plurality of components on a support surface, the components being spaced from each other, with the layer of electro-optic material facing away from the support surface; and
- contacting the disposed plurality of components with a light-transmissive substrate under conditions effective to cause the plurality of components to adhere to the substrate.

In this first process of the invention, the support surface may comprise a template having a plurality of recesses within which the components are received. Each of the components may further comprise a substrate adhesive layer disposed on the opposed side of the layer of electro-optic material from the at least one of an adhesive layer and a release layer, and the components are disposed on the support surface with the substrate adhesive layer facing the substrate, so that the substrate adhesive layer acts to adhere the components to the substrate. The first process may further comprise: forming a sub-assembly comprising an adhesive layer on a second substrate; and, after adhering the components to the light-transmissive substrate, removing the release layer from the components, and contacting the components with the adhesive layer on the second substrate under conditions effect to cause the components and the light-transmissive substrate to adhere to the adhesive layer. The substrate used in the first process may comprise a light-transmissive electrically-conductive layer.

In another aspect, this invention provides a (second) process for forming a first sub-assembly of the present invention, this second process comprising:

- forming a layer of electro-optic material on a release sheet;
- severing the layer of electro-optic material on the release sheet to define a plurality of discrete areas separated from each other by gutter areas;
- removing the layer of electro-optic material from the gutter areas while leaving the electro-optic material on the release sheet in the plurality of discrete areas; and
- after removal of the layer of electro-optic material from the gutter areas, adhering a light-transmissive substrate to the electro-optic material in the plurality of discrete areas.

This second process of the present invention may further comprise: forming an adhesive layer overlying the layer of electro-optic material on the release sheet; severing both the layer of electro-optic material and the adhesive layer to define the plurality of discrete areas; removing both the layer of electro-optic material and the adhesive layer from the gutter areas; and after removal of the layer of electro-optic material and the adhesive layer from the gutter areas, contacting the light-transmissive substrate with the adhesive layer in the plurality of discrete areas, thereby causing the light-transmissive substrate to adhere to the adhesive layer.

Alternatively or in addition, the second process of the invention may further comprise: providing a release layer overlying the adhesive layer on the release sheet; severing the layer of electro-optic material, the adhesive layer and the release layer to define the plurality of discrete areas; and removing the release layer from both the plurality of discrete areas and the gutter areas prior to contacting the light-transmissive substrate with the adhesive layer. The removal of the release layer may be effected in two stages, with the first stage causing removal of the release layer from the gutter areas, leaving the release layer covering the adhesive layer and the layer of electro-optic material in the plurality of discrete areas, and the second stage causing removal of the release layer from the adhesive layer and the layer of electro-optic material in the plurality of discrete areas.

Another form of the second process of the present invention further comprises: forming a sub-assembly comprising an adhesive layer on a second release sheet; and after adhering the light-transmissive substrate to the electro-optic material in the plurality of discrete areas, removing the release sheet from the layer of electro-optic material, and contacting the electro-optic material with the adhesive layer of the sub-assembly, thereby adhering the sub-assembly to the layer of electro-optic material.

In the second process of the present invention, the removal of the layer of electro-optic material from the gutter areas may be effected by placing a sheet of material over both the plurality of discrete areas and the gutter areas, and thereafter removing the sheet of material with the portions of the electro-optic material from the gutter areas attached thereto, while leaving the electro-optic material in the plurality of discrete areas. Alternatively after severing the layer of electro-optic material, the adhesive layer and the release layer to define the plurality of discrete areas, the portion of the release layer in the gutter areas may first be removed, and thereafter a sheet of material may be placed over both the plurality of discrete areas and the gutter areas, and the sheet of material thereafter removed with the portions of the adhesive layer and the electro-optic material from the gutter areas attached thereto, while leaving the adhesive layer and the electro-optic material in the plurality of discrete areas. The removal of the sheet of material may also remove the release layer from the plurality of discrete areas. The substrate may comprise a light-transmissive electrically-conductive layer.

This invention also provides a display assembly comprising:

- a backplane assembly comprising a plurality of spaced backplane areas, each backplane area comprising a plurality of electrodes, the backplane areas being separated by gutter areas free from electrodes;
- an adhesive layer overlying the plurality of spaced backplane areas; and
- a layer of a solid electro-optic medium overlying the adhesive layer in the plurality of spaced backplane areas.

Such a display assembly may further comprise at least one of a light-transmissive electrically-conductive layer and a protective layer overlying the layer of solid electro-optic medium in the plurality of spaced backplane areas. In a preferred form of the display assembly, a light-transmissive electrically-conductive layer overlies the layer of solid electro-optic medium in the plurality of spaced backplane areas, and a protective layer overlies the light-transmissive electrically-conductive layer in the plurality of spaced backplane areas. Each backplane area may be provided with at least one front plane contact electrode and the portion of the light-transmissive electrically-conductive layer adjacent each front plane contact electrode may be essentially free of solid electro-optic material. The display assembly may further comprise a removable masking film overlying the protective layer in the plurality of spaced backplane areas.

The display assemblies of the present invention may make use of any of the types of solid electro-optic materials discussed above. Thus, for example, the display assembly may comprise a rotating bichromal member or electrochromic material. Alternatively, the display assembly may comprise an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material. The fluid may be liquid or gaseous.

In one main variant of the display assembly of the present invention, the gutter areas are essentially free from both the adhesive layer and the layer of solid electro-optic medium so that both the adhesive layer and the layer of solid electro-optic material have the form of a series of discrete islands, each island overlying one of the plurality of backplane areas. This variant of the display assembly may further comprise a substrate disposed on the opposed side of the adhesive layer and the layer of solid electro-optic medium from the backplane assembly, and adhering to all the islands of the layer of solid electro-optic material.

In a second main variant of the display assembly of the present invention, the adhesive layer and the layer of solid electro-optic material extend across the gutter areas, the adhesive layer and the layer of solid electro-optic material being at least partially severed along the peripheries of the gutter areas, such that the portions of the adhesive layer and the layer of solid electro-optic material overlying the gutter areas can be removed from the gutter areas without removing the portions of the adhesive layer and the layer of solid electro-optic material overlying the backplane areas.

This invention also provides a process for forming a display assembly of the invention, the process comprising:
    forming a plurality of components, each component comprising a layer of solid electro-optic material and an adhesive layer;
    disposing the plurality of components on a support surface, the components being spaced from each other, with the adhesive layer facing away from the support surface; and
    contacting the disposed plurality of components with a backplane assembly comprising a plurality of spaced backplane areas, each backplane area comprising a plurality of electrodes, the backplane areas being separated by gutter areas free from electrodes, the contacting being effected under conditions effective to cause the plurality of components to adhere to the backplane areas of the backplane assembly.

In this process, the support surface may comprise a template having a plurality of recesses within which the components are received. At least part of the surface of the substrate may be tacky, the tacky surface of the substrate serving to hold the components in fixed positions on the substrate during the contacting of the components with the backplane assembly. Also, in this process, each component may further comprise a release layer on the opposed side of the adhesive layer from the layer of solid electro-optic material, the release layer being removed from the components after the components have been placed on the substrate but before the components are contacted with the backplane assembly. Each component may comprise at least one of a light-transmissive electrically-conductive layer and a protective layer on the opposed side of the layer of solid electro-optic medium from the adhesive layer, and each backplane area may be provided with at least one front plane contact electrode and the portion of the light-transmissive electrically-conductive layer of each component adjacent each front plane contact electrode may be essentially free of solid electro-optic material.

The aforementioned process may further comprise removing the support surface from the components after the components are adhered to the backplane areas of the backplane assembly. Alternatively or in addition the process may comprise severing the backplane assembly after the components are adhered thereto, thereby separating the plurality of backplane areas from one another and forming a plurality of discrete electro-optic displays.

The present invention also provides a second process for forming a display assembly of the invention of the type in which the adhesive layer and the layer of solid electro-optic material extend across the gutter areas but are at least partially severed along the peripheries of the gutter areas. The second process comprises:
    forming an electro-optic sheet comprising, in this order, a layer of solid electro-optic material, an adhesive layer, and a release sheet;
    partially severing the electro-optic sheet to define a plurality of discrete components separated from each other by gutter areas, the layer of solid electro-optic material, adhesive layer, and release sheet being severed along at least the major portion of the periphery of each component;
    removing the release sheet from the adhesive layer in the plurality of discrete components but leaving the release sheet in contact with the adhesive layer in the gutter areas; and
    contacting the electro-optic sheet with a backplane assembly comprising a plurality of spaced backplane areas, each backplane area comprising a plurality of electrodes, the contacting being effected such that each component becomes aligned with one of the spaced backplane areas under conditions effective to cause the plurality of components to adhere to the backplane areas of the backplane assembly, thereby producing the display assembly.

This process may further comprise removing the layer of solid electro-optic material, adhesive layer, and release sheet from the gutter areas, and may also comprise severing the backplane assembly after removal of the layer of solid electro-optic material, adhesive layer, and release sheet from the gutter areas, thereby separating the plurality of backplane areas from one another and forming a plurality of discrete electro-optic displays. The electro-optic sheet used in this process may comprise at least one of a light-transmissive electrically-conductive layer and a protective layer on the opposed side of the layer of solid electro-optic medium from the adhesive layer, and when this type of electro-optic sheet is used, each backplane area may be provided with at least one front plane contact electrode and, prior to the contacting of the electro-optic sheet with the backplane assembly, the layer of electro-optic material may be removed from the portion of the light-transmissive electrically-conductive layer which will lie adjacent each front plane contact electrode.

DETAILED DESCRIPTION

Figure 1A:
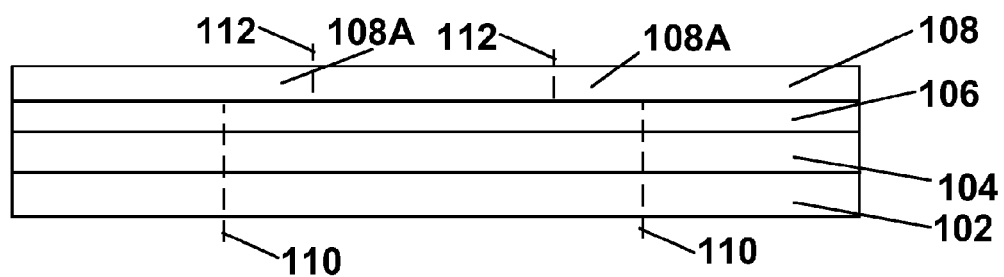
FIGS. 1A to 1E of the accompanying drawings are schematic side elevations illustrating various states of one form of the first process of the present invention which produces a first sub-assembly of the invention.

Reference will be made hereinafter to "loose" and "tight" release sheets. These terms are used in their conventional meaning in the art to indicate the magnitude of the force necessary to peel the relevant release sheet from the layer with which it is in contact, a tight release sheet requiring more force than a loose release sheet. In particular, if a stack of layers has a tight release sheet on one side and a loose release sheet on the other, it is possible to peel the loose release sheet away from the stack without separating the tight release sheet from the stack. In general, when a tight release sheet and a loose release sheet are to be present in the same stack, the tight release sheet should have an adhesion at least about 1.5 times, and preferably about 3 times, the adhesion of the loose release sheet.

As already indicated, some of the sub-assemblies of the present invention contain two separate adhesive layers. When necessary or desirable, the two adhesive layers will be denoted as "front" and "rear" adhesive layers, these terms denoting the position of the relevant adhesive layer in the final display produced by laminating the sub-assembly to a backplane; the front adhesive layer is the adhesive layer lying between the electro-optic medium and the viewing surface of the display (i.e., the surface through which an observer views the display, normally the surface remote from the backplane and regarded as the "front" of the display), while the rear adhesive layer lies on the opposed side of the electro-optic layer from the front adhesive layer, and adjacent the backplane. In the common situation where a display has a single front electrode between the electro-optic layer and the viewing surface and a plurality of pixel electrodes on the backplane and thus on the opposed side of the electro-optic layer, the front adhesive layer lies between the electro-optic layer and the front electrode, while the rear adhesive layer lies between the electro-optic layer and the pixel electrodes.

The accompanying drawings are not strictly to scale. In particular, for ease of illustration, the thicknesses of the various layers are greatly exaggerated relative to their lateral dimensions. The present invention is well adapted for the production of thin, flexible, electro-optic displays; typically, the sub-assemblies or front plane laminates which are the products of the processes described below will have thicknesses (measured without the remaining release sheet, which is discarded before the final lamination to a backplane) of about 100 µm, and can be laminated to flexible backplanes of similar thickness.

As already indicated, FIGS. 1A-1E, 2A-2F and 3A-3D of the accompanying drawings illustrate various stages of three different processes of the present invention, all of which ultimately produce first sub-assemblies of the present invention; the second process shown in FIGS. 2A-2F also produces a second sub-assembly of the present invention. Accordingly, it is considered most convenient to first describe the various sub-assemblies of the invention produced by these processes and thereafter to describe the may in which these sub-assemblies are produced by the multi-step processes of the present invention.

Figure 1D:
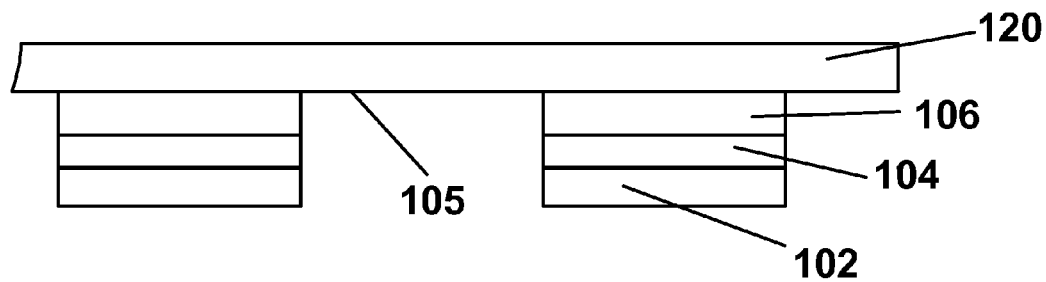
Figure 1E:
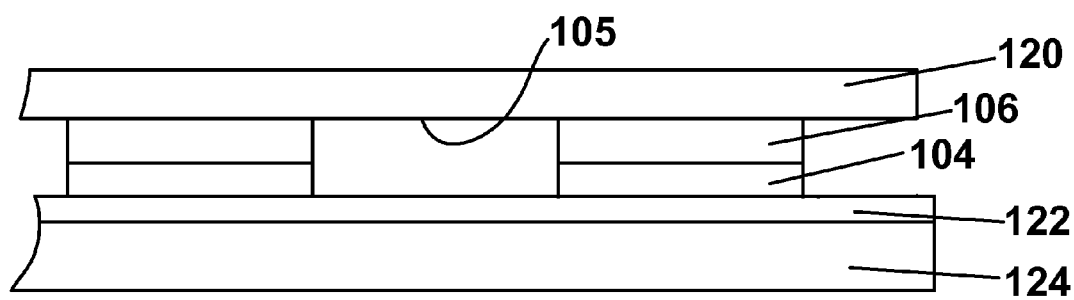
Figure 2A:
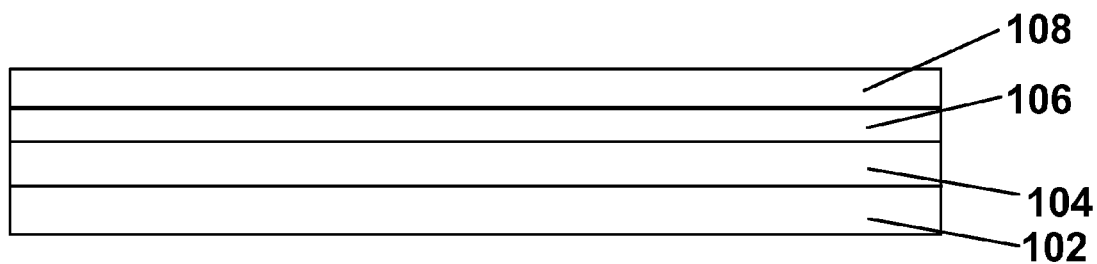
FIGS. 2A to 2F are schematic side elevations illustrating various states of one form of the second process of the present invention, this second process producing both first and second sub-assemblies of the invention.
Figure 2B:
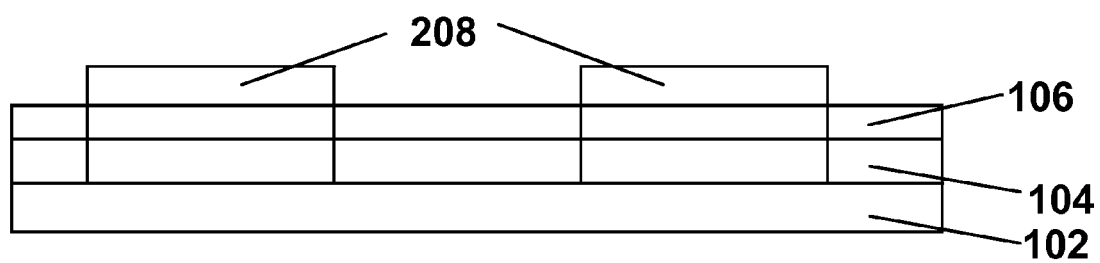
Figure 2C:
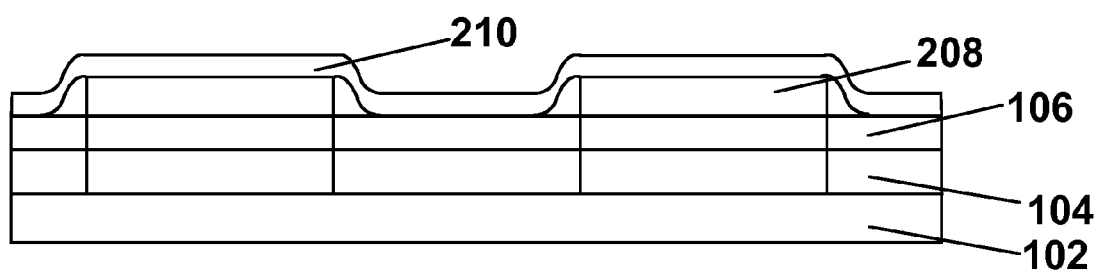
Figure 2D:
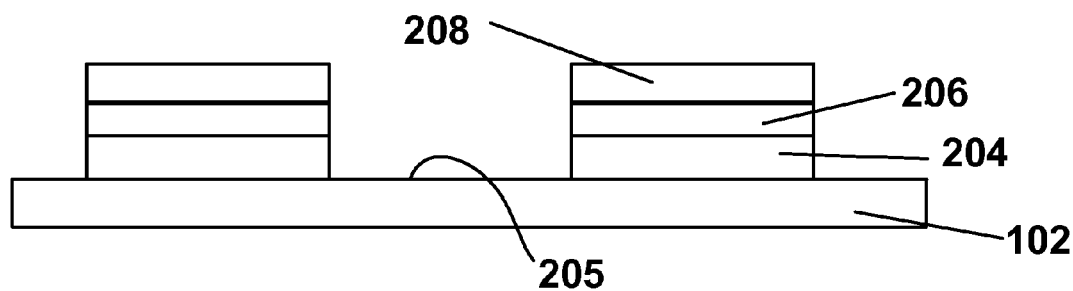
Figure 2E:
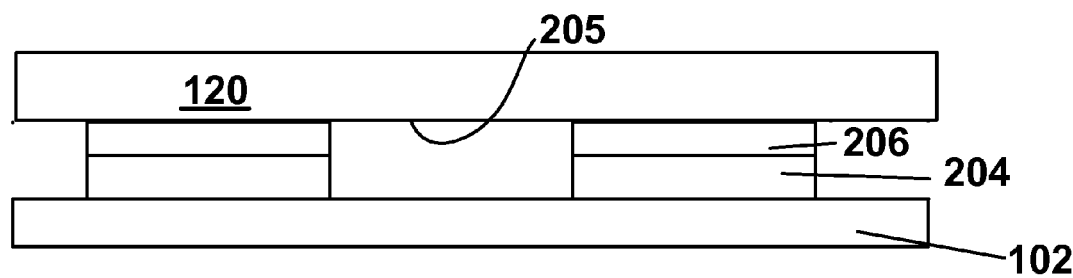
Figure 2F:
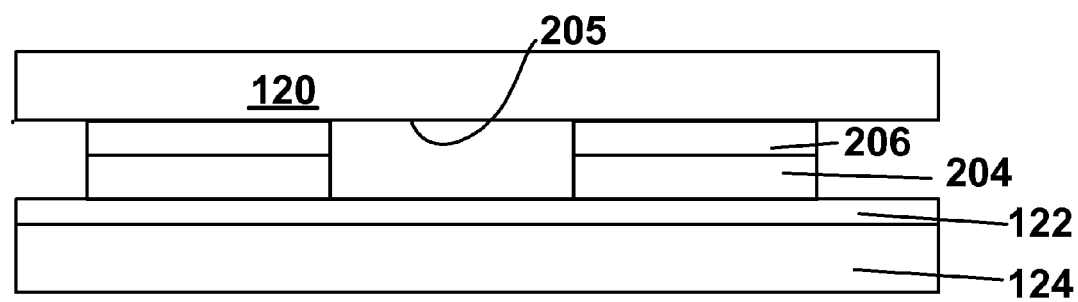

The first sub-assemblies of the present invention produced by the illustrated processes are shown in FIGS. 1D, 1E, 2E and 2F of the accompanying drawings; as explained below, the third process shown in FIGS. 3A-3D ultimately produces first sub-assemblies identical to those shown in FIGS. 2E and 2F. The first sub-assemblies shown in FIGS. 1E and 2F are specialized forms of the inverted front plane laminates described in the aforementioned 2007/0109219; other first sub-assemblies of the present invention (not illustrated) may be specialized forms of the "classic" (i.e., non-inverted) front plane laminates described in the aforementioned U.S. Pat. No. 6,982,178.

The first sub-assemblies of the present invention comprise a light-transmissive substrate 120 in each of FIGS. 1D, 1E, 2E and 2F. The substrate 120 is typically a multi-layer structure and usually includes a light-transmissive electrode layer, for example an indium-tin-oxide (ITO) layer, which forms the front electrode of the final display; this electrode layer is not shown separately in the drawings. However, substrates 120 lacking electrode layers can be used, for example in electro-optic displays which are intended to be written using a stylus or similar external electrode.

The first sub-assemblies of the present invention further comprise a plurality of discrete areas of an electro-optic material (104 in FIGS. 1D and 1E, 204 in FIGS. 2E and 2F) disposed on the substrate 120. The sub-assemblies illustrated have a substrate (or front) adhesive layer (106 in FIGS. 1D and 1E, 206 in FIGS. 2E and 2F) interposed between the electro-optic material 104 or 204 and the substrate 120 although in some cases this front adhesive layer can be omitted, for example by using an electro-optic material comprising a binder which functions as its own adhesive, as described in the aforementioned U.S. Pat. No. 7,110,164. The discrete areas of electro-optic material 104 or 204 are separated from each other by gutter areas (105 in FIGS. 1D and 1E, 205 in FIGS. 2E and 2F) free from the electro-optic material and the adhesive layer 106 or 206. Although the drawings each illustrate only two discrete areas of electro-optic material separated by a single gutter area, in practice each sub-assembly would normally have a larger number of discrete areas of electro-optic material; for example, a sub-assembly intended for producing six individual displays might have a 3×2 arrangement of such areas, separated from each other by two parallel gutter areas and a third gutter area extending at right angles to the first two. Indeed, as described in detail below, certain sub-assemblies of the present invention can be in the form of continuous webs of indefinite length, with a large number of areas of electro-optic material arranged in a two dimensional array and separated from each other by two sets of gutter areas extending in perpendicular directions.

The first sub-assemblies of the present invention further comprise at least one of an adhesive layer and a release layer on the opposed side of the layer of electro-optic material from the substrate. The first sub-assemblies shown in FIGS. 1D and 2E possess only a release layer 102 on the opposed side of the layer of electro-optic material from the substrate, whereas the sub-assemblies shown in FIGS. 1E and 2F possess both an adhesive layer 122 in contact with the electro-optic layer 104 or 204 and a release layer 124 on the opposed side of the adhesive layer 122 from the electro-optic layer 104 or 204. Note that in FIG. 1D the release layer 102 is discontinuous, with separate pieces of release layer 102 just covering the adjacent areas of the electro-optic layer 104 and not extending across the gutter areas 105, whereas in FIG. 2E the release layer 102 is continuous and extends across the gutter areas 205. In both FIGS. 1E and 2F, both the adhesive layer 122 and the release layer 124 are continuous and extend across the gutter areas 105 or 205.

A second sub-assembly of the present invention is illustrated in FIG. 2D. This sub-assembly comprises a release sheet 102 bearing a plurality of discrete areas of electro-optic material 204, the discrete areas 204 being separated from each other by gutter areas 205 free from the electro-optic material. The second sub-assembly further comprises an adhesive layer 206 on the opposed side of the electro-optic layer from the release sheet 102 and a release layer or sheet 208 on the opposed side of adhesive layer 206 from the release sheet 102. For reasons already explained, in some cases the adhesive layer 206 could be omitted. The release sheet 208 shown in FIG. 2D is discontinuous and does not extend across the gutter areas 205, but second sub-assemblies of the present invention having continuous release sheets similar to 208 can be produced if desired.

The methods used to produce the sub-assemblies of the present invention will now be described in detail A first method of the present invention, illustrated in FIG. 1, is especially but not exclusively intended for the production of small electro-optic displays. In the first step of the process, an electro-optic medium is coated or otherwise deposited on to a tight release sheet 102 to form a continuous electro-optic layer 104. Separately, a continuous front adhesive layer 106 is coated on to a loose release sheet 108. The two resulting sub-assemblies are then laminated to each other with the adhesive layer 106 is contact with the electro-optic layer 104 to produce the structure shown in FIG. 1A. These steps are as described in the aforementioned U.S. Pat. No. 7,110,164, and resulting assembly is a double release sheet as described in the aforementioned 2004/0155857.

In the next step of the process, the sheet shown in FIG. 1A is severed into pieces of appropriate size to form individual displays. Although other methods such as die cutting may be used, the cutting of the sheet is conveniently effected by laser cutting, as indicated by lines 110 and 112 in FIG. 1A so as to leave a tab 108A of the loose release sheet 108 extending outwardly beyond the other layers. At this point, cuts may, and typically are, made completely through the sheet to provide any desired apertures or cut-outs in the front adhesive layer 106 and electro-optic layer 104; for example, apertures may be cut through the front adhesive and electro-optic layers to provide pre-formed connection apertures as described in the aforementioned application Ser. No. 11/682,409, which will eventually be used (in combination with corresponding apertures in the rear adhesive layer, as described below) to form conductive vias connecting the front electrode to the backplane in the final display. The loose release sheet 108 is then removed from the assembly, conveniently by pulling on the tab 108A.

A plurality of these pieces (designated 114 in FIG. 1B) with the loose release sheet 108 removed are then placed, adhesive side up, in a template or jig comprising a thin alignment sheet 116 taped to a laminating tray 118. The alignment sheet 116 is disposable and is typically discarded after three or four laminations (as described below), whereas the laminating tray is permanent; this arrangement has the advantage that the alignment sheet 116 can rapidly be changed to enable various parts to be laminated in the same laminator without the need for a plurality of expensive metal templates. Also, at least in some cases, the alignment sheet 116, which is typically formed of a polymeric film, for example poly(ethylene terephthalate) (PET), can be laser cut using the same digital file used to laser cut the pieces 114. The thickness of the alignment sheet 116 should be chosen so that the upper (adhesive) surfaces of the pieces 114 extend slightly (about 1-2 mil, 25-51 μm) above the alignment sheet 116.

Figure 1B:
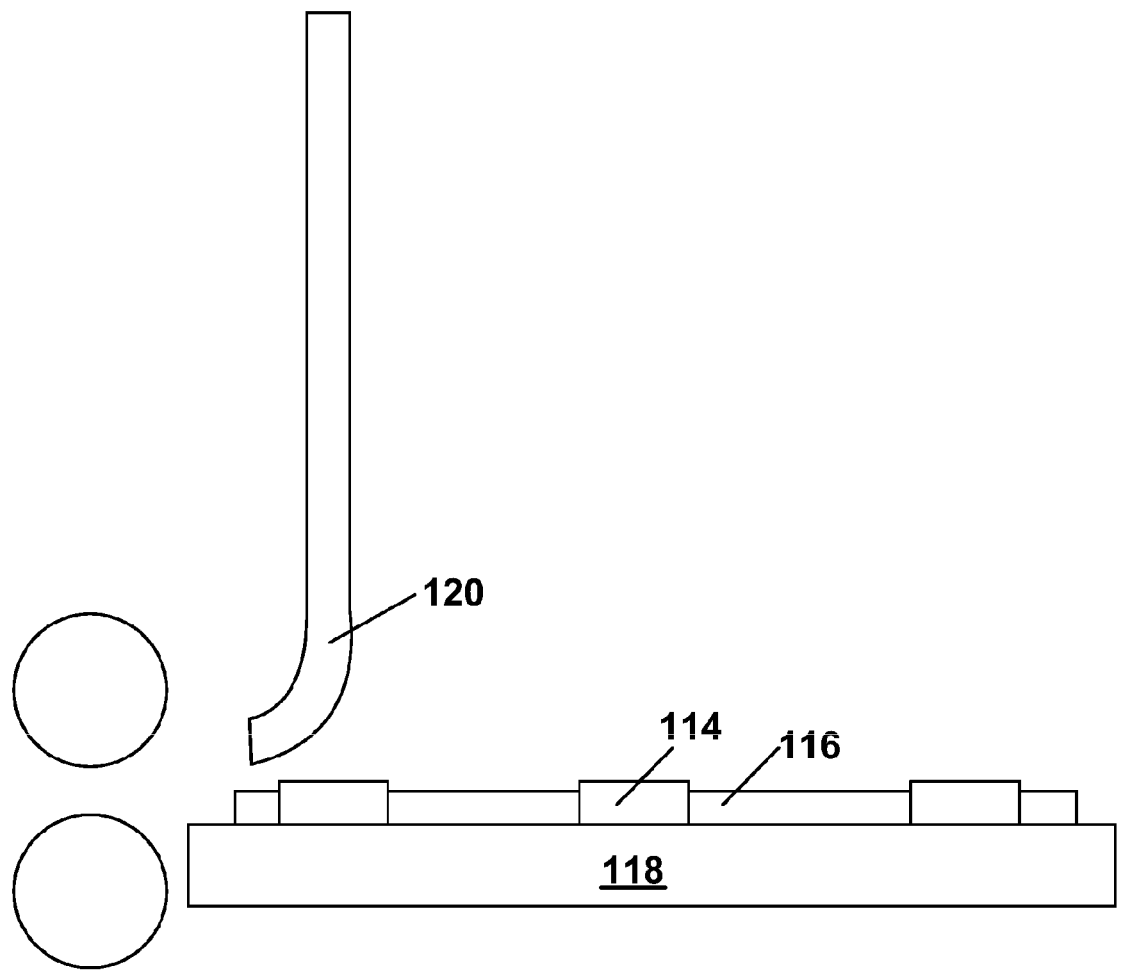

As illustrated in FIG. 1B, the pieces 114 held in the template 116, 118, are then laminated to an oversized (i.e., larger than the alignment sheet 116) sheet of a front substrate 120. The front substrate 120 is a multi-layer structure including an indium-tin-oxide (ITO) layer which forms the front electrode of the final display. The front substrate further comprises a removable masking film, which is removed before the final display is placed in use, as described below.

This front substrate structure is designed to provide the front light-transmissive electrode for the final display. The front substrate 120 also provides the necessary mechanical support for this thin and relatively fragile front electrode. In addition, the front substrate preferably provides all necessary water vapor and oxygen barriers, and ultra-violet absorption properties, desirable to protect certain electro-optic layers, especially electrophoretic layers. The front substrate may also provide desirable anti-glare properties to the viewing surface of the final display. The front substrate 120 serves all of these functions while still being thin and flexible enough to enable the formation of a final display sufficiently flexible to be wound around a mandrel of (say) 15 mm diameter. As already noted, the front substrate includes a masking film; this masking film is provided primarily to increase the thickness of the front substrate so as to facilitate handling of this substrate during the laminations. In a preferred process, the total thickness of the front substrate as it remains in the final display (i.e., with the masking film removed) is only about 1 mil (25 μm) and the masking film is used to add about 2 mil (51 μm) to this thickness for ease of handling. The masking film also typically serves to prevent scratching or adhesion of dust or debris to an adjacent anti-glare layer during the laminations.

Following the lamination shown in FIG. 1B, the sheet of front substrate 120 with the pieces 114 secured thereto, is removed as a single unit from the template 116, 118. FIG. 1D shows an enlarged view of two of the pieces 114 on the substrate 120, the pieces 114 and the substrate 120 together forming a first sub-assembly of the present invention, as already described. The substrate 120 bearing the pieces 114 is then placed on a laser cutter with the pieces 114 facing the laser. The laser cutter is then used to cut tooling holes through the front substrate 120 in positions aligned with the positions of the pieces 114; these tooling holes will be used to engage the sheet with alignment pins to locate the sheet during a later lamination, as described below. Alternatively, tooling holes could be pre-cut in the front substrate 120 before this front substrate is laminated to the pieces 114, and if such pre-cut tooling holes are provided, they can be engaged with pins provided on the template 116, 118 to align the front substrate during its lamination to the pieces 114.

Separately, a rear adhesive layer 122 (FIG. 1C) is coated on to a release sheet 124, and the exposed surface of the rear adhesive layer is covered by an interleaf (in effect, a further release sheet—not shown in the drawings) which serves to prevent contamination of the surface of the adhesive layer during laser cutting. The release layer/adhesive/interleaf "sandwich" is laser cut, with the interleaf facing the laser, to form tooling holes similar to those previously cut through the front substrate, and intended for the same purpose. The laser cutter may also be used to cut other apertures through the adhesive layer required for specific displays; for example, the laser cutter may cut apertures which, in conjunction with corresponding apertures previously cut in the front adhesive and electro-optic layers, will constitute pre-formed connection apertures as described in the aforementioned application Ser. No. 11/682,409.

Figure 1C:
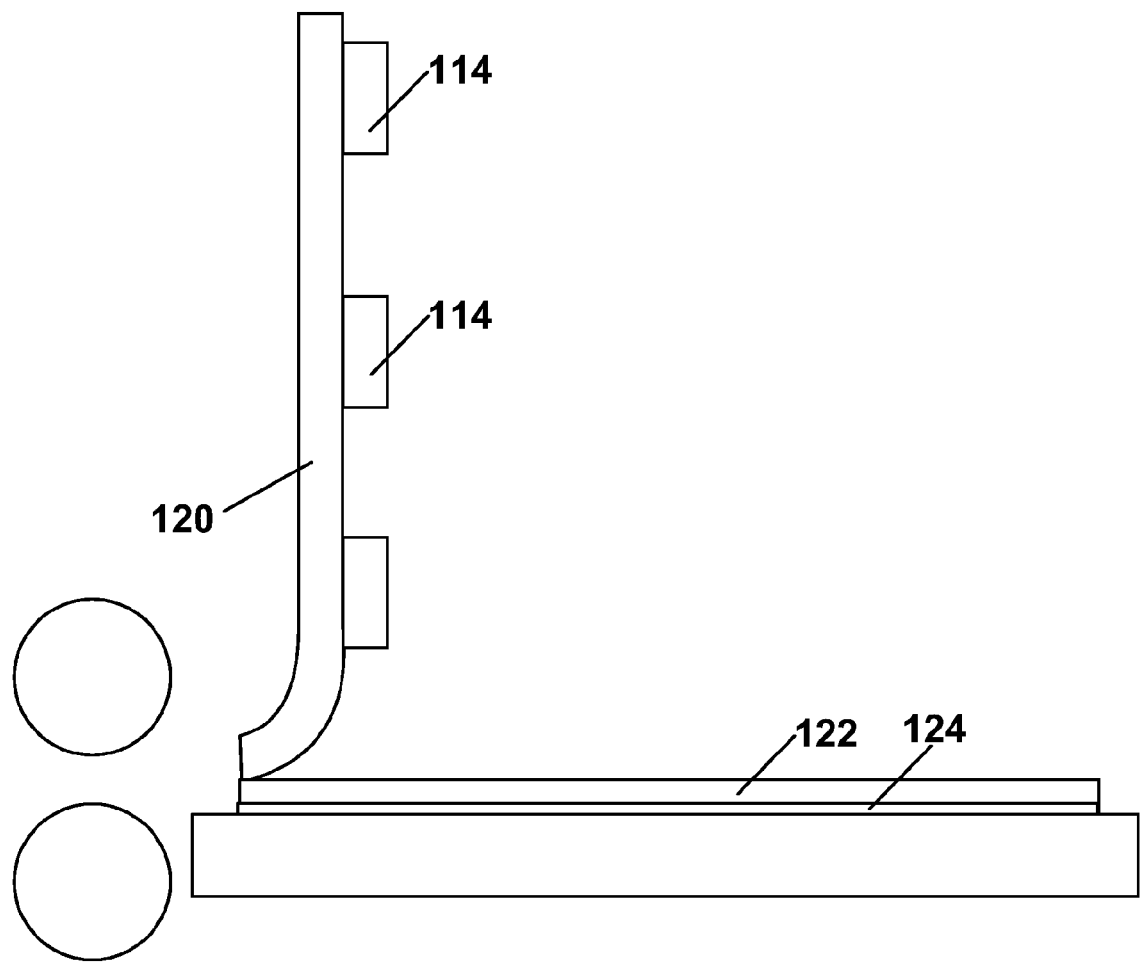

In the next step of the process, the interleaf is removed from the rear adhesive layer, 122, which is then placed, together with its adhering release sheet 124, on the bed of a laminator, with its tooling holes engaged with alignment pins (not shown) on the laminator, as illustrated in FIG. 1C. The tight release sheet 102 is peeled from the pieces 114 carried on the substrate 120, and the tooling holes previously cut in the release sheet 120 are also engaged with the alignment pins on the laminator, such that the exposed surface of the electro-optic layer 104 is facing the rear adhesive layer 122. The two sheets are them laminated together, thus forming an inverted front plane laminate as described in the aforementioned 2007/0109219. FIG. 1E is an enlarged view, similar to that of FIG. 1D and illustrating a portion of substrate 120 bearing two pieces 114 at the same stage as FIG. 1C. As already noted, the structure shown in FIG. 1E constitutes a first sub-assembly of the present invention.

At this point, the masking film is typically removed, since it is convenient to remove this film in one piece before the individual displays are separated from each other; however, removal of the masking film can be effected later if desired. Whether or not the masking film is removed, the next major step is separation of the sheet into a plurality of pieces of inverted front plane laminate. This separation is effected by laser cutting of the laminated sheet which is held on alignment pins to ensure accurate location of the cuts. The cuts sever the third release sheet 124, rear adhesive layer 122 and front substrate 120 to produce separate pieces of an inverted front plane laminate which are ready, after removal of the third release sheet 124, for lamination to backplanes to form the final displays. The cutting of the laminated sheet is desirably effected so as to leave a tab of the third release sheet 124 extending beyond the front substrate 120, adhesive layers 106 and 122 and electro-optic layer 104; such a tab facilitates removal of the third release sheet 124 during the production of the final displays.

A second process of the invention, illustrated in FIGS. 2A-2F of the accompanying drawings, is primarily intended for use in producing larger displays than the first process described above with reference to FIGS. 1A-1E; the parts produced by the second process are sufficiently large that loss of the electro-optic material present in gutter areas between adjacent displays can be tolerated. As will be apparent from the detailed description of the second process below, the main difference between the first and second processes is that the second process does not make use of a jig to align separate pieces of electro-optic medium on a front substrate; instead, in the second process, a continuous layer of electro-optic material is severed to produce multiple "islands" of electro-optic material separated by gutter areas free from electro-optic material.

The second process of the present invention is identical to the first process up to the point shown in FIG. 2A, which is identical to FIG. 1A. However, as may be seen by comparing FIGS. 1B and 2B, the next cutting step differs. The cutting step of the second process is effected with the loose release sheet 108 facing the laser cutter and with kiss cutting such that the loose release sheet 108, the front adhesive layer 106 and the electro-optic layer 104 are severed but the tight release sheet 102 is not. Also in this step, as in the first process, any through apertures needed for alignment holes, pre-formed connection apertures or other purposes may be cut (although this can also be done later, as described below). Since it may in some cases be possible to carry out the entire second process on a roll-to-roll basis, the through apertures formed in this step may include tractor feed holes formed along the side edges of a web of material and serving as alignment holes for later stages of the process.

The continuous portion of the loose release sheet 108 (i.e., the portion of this release sheet covering what will become the gutter areas at later stages of the process) is then removed, either manually or mechanically, thus leaving the structure shown in FIG. 2B, in which "islands" 208 of loose release sheet corresponding to the final displays remain above continuous but severed layers of front adhesive layer 106 and electro-optic layer 104. The next step of the process is removal of the unwanted parts of the front adhesive and electro-optic layers 106 and 104 respectively. This removal can be effected manually, since the front adhesive and electro-optic layers possess sufficient mechanical cohesion that they can be manually rolled up on themselves and removed in large pieces from the underlying tight release sheet 102. However, as illustrated in FIG. 2C, in the preferred method for removal of the unwanted parts of the front adhesive and electro-optic layers, a sacrificial sheet 210 (which does not need to be tacky) is cold rolled over the islands 208 and the exposed portions of the front adhesive layer 106. The sacrificial sheet 210 is then removed, thus removing the portions of the front adhesive layer 106 and electro-optic layer 104 not covered by the islands 208, and leaving the structure shown in FIG. 2D. As described above, this structure comprises a second sub-assembly of the present invention, in which there extend upwardly from the tight release sheet 102 multiple "mesas" comprising the islands 208 of the loose release sheet and similarly sized underlying areas 206 and 204 of the front adhesive layer and electro-optic layer respectively, with the mesas being separated from each other by gutter areas 205. As in the first process of the present invention described above, in some cases it may be possible to omit the front adhesive layer 206, for example when the electro-optic material can act as its own adhesive. Also, as should readily be apparent, each of these mesas will eventually form a separate display. (In some cases, it may be possible to recycle the portions of the front adhesive layer and electro-optic layer removed on the throw-away sheet 210 in other small displays.)

In the next step, the remaining portions 208 of the loose release sheet are peeled from the structure shown in FIG. 2D and the remaining layers of the structure are laminated to a sheet of the front substrate 120, which can be identical to that used in the first process of the invention as described above, and which can have previously been provided with any apertures needed for engagement with alignment pins etc. during later stages of the process. The first sub-assembly of the invention resulting from this lamination is shown in FIG. 2E and has already been described in detail above.

Although produced by a very different route, the sub-assembly shown in FIG. 2E is very similar to that produced in the first process of the invention following the lamination shown in FIG. 1B and the subsequent laser cutting, the only difference being that in the structure of FIG. 2E the tight release sheet 102 is continuous. Accordingly, the remaining steps of the second process are essentially identical to those of the first. Again, a rear adhesive layer 122 is coated on to a third release sheet 124, an interleaf is applied over the adhesive layer 122 and any necessary apertures are cut in the resulting structure. The interleaf is then removed, the tight release sheet 102 is removed from the structure of FIG. 2E, and the two resulting films are laminated together to produce the final inverted front plane laminate or sub-assembly shown in FIG. 2F, which is identical to that produced by the first process of the invention.

Figure 3A:
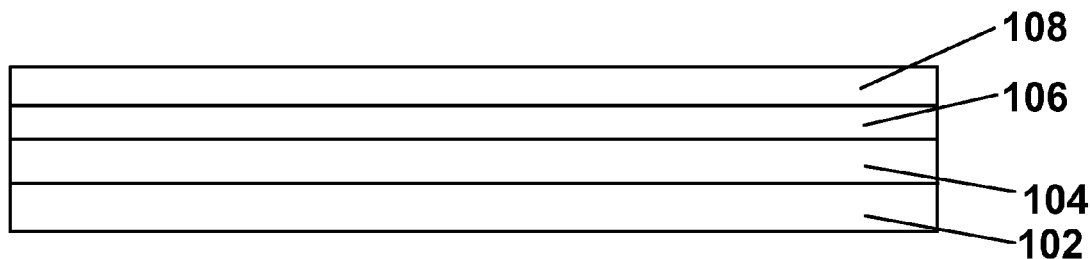
FIGS. 3A to 3D are schematic side elevations illustrating various states of a modified form of the second process of the invention shown in FIGS. 2A to 2F, this modified process again producing both first and second sub-assemblies of the invention.
Figure 3B:
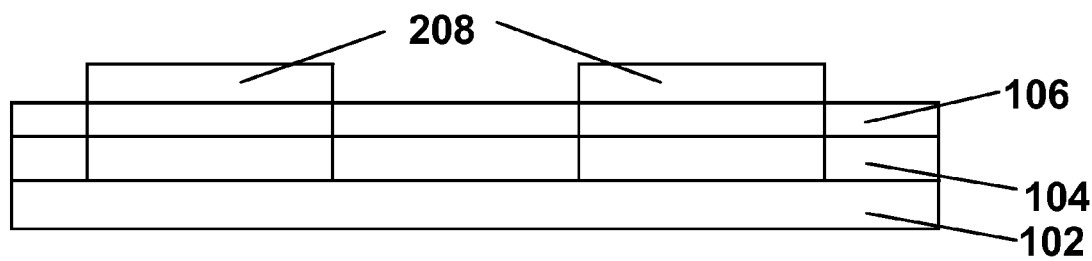
Figure 3C:
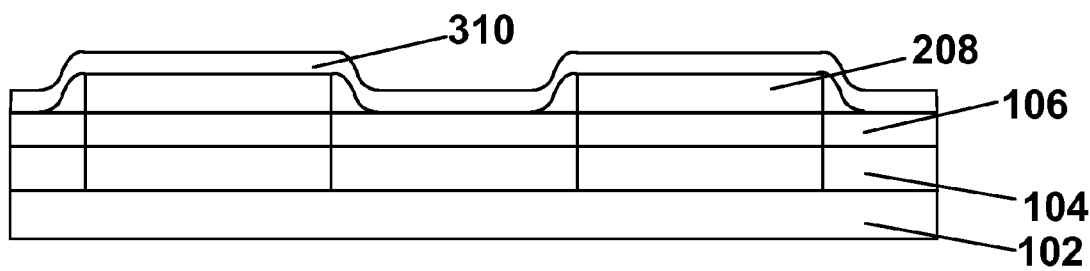

The third process of the present invention shown in FIGS. 3A-3D is essentially a variant of the second process described above. As shown in FIGS. 3A and 3B, which are identical to FIGS. 2A and 2B respectively, the third process is identical to the second up to the point shown in FIG. 3B. However, in the next step of the process, instead of the throwaway sheet 210, a tacky film 310 (FIG. 3C) is rolled over, and adheres to, the exposed surfaces of both the loose release sheet 108 and the front adhesive layer 106. Accordingly, when the tacky film 310 is removed, the remaining loose release sheet 108, and the unwanted portions of the front adhesive layer 106 and electro-optic 104 are removed therewith, thus producing the structure shown in FIG. 3D; in effect, the use of the tacky film 310 enables the step from FIG. 2B to FIG. 2C and the subsequent removal of the loose release sheet prior to lamination to the front substrate 120, to be combined into a single operation. Once the structure shown in FIG. 3D has been produced, the remaining steps of the third process are identical to those of the second.

It should be noted that, in this third process of the invention, all removal of unwanted material is effected in sheet form, or in continuous web form if the process is carried out using continuous webs of material. Accordingly, the third process of the invention is very suitable for use on a continuous, roll-to-roll basis.

Figure 3D:
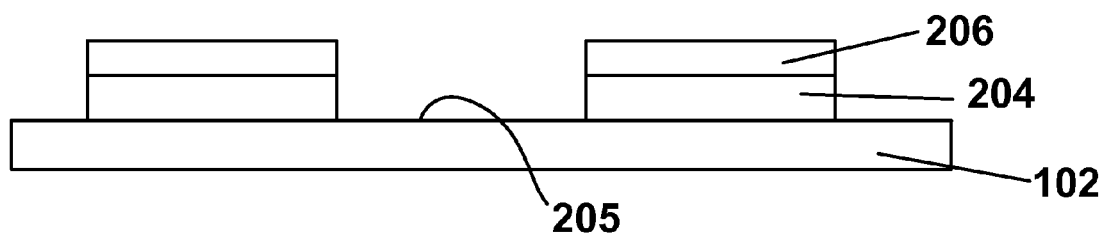

If, however, the process shown in FIGS. 3A-3D and the subsequent laminations to form the final electro-optic displays are to be carried out on continuous webs, care must be taken to maintain correct alignment throughout the various steps of the process. At the point shown in FIG. 3D, the "mesas" 204, 206 are produced at known locations on the release sheet 102. If the structure shown in FIG. 3D is to be subjected to a lamination similar to that shown in FIG. 1B so as to attach the mesas to a front substrate, and thereafter to laminate the mesas on the front substrate first to backplanes (with or without intervening lamination of an adhesive layer to the electro-optic layer 204) carried on a web, it is obviously necessary ensure that the mesas end up aligned with the backplanes. Since the initial alignment is between the mesas and the release sheet 102, removal of this release sheet can destroy the alignment. To ensure that the mesas end up aligned with the backplanes, it is necessary to first transfer the mesas to known positions relative to some fixed marker on the front substrate, and then to bring the front substrate bearing the mesas into contact with the backplanes so that the fixed marker on the front substrate is in a known alignment with the backplanes. The necessary alignments are most readily achieved by providing all the webs with tractor feed holes and ensuring that the webs are driven by common tractor feed devices so that they automatically remain in the desired alignment with each other.

The process described above all use inverted front plane laminates of the type described in the aforementioned 2007/0109219. However, the present invention is not restricted to the use of such inverted front plane laminates but can also be applied to the "classic" front plane laminates of the type described in the aforementioned U.S. Pat. Nos. 6,982,178 and 7,236,292, and processes using such classic front plane laminates will now be described with reference to FIGS. 4A-4I and 5A-5C.

Figure 4A:
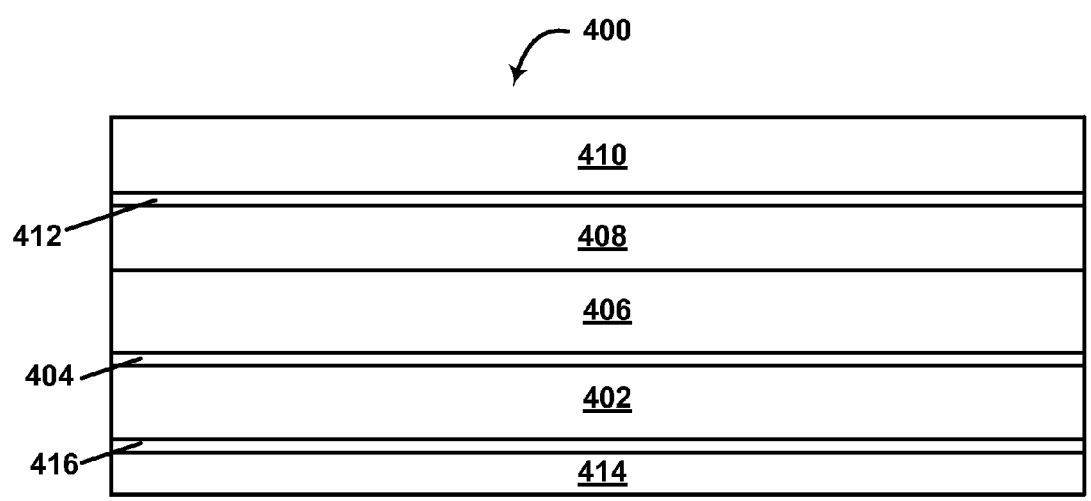
FIG. 4A is a schematic side elevation through part of a sheet of FPL used in a third process of the invention for producing a large number of small displays.

FIG. 4A a schematic side elevation through part of a sheet of classic FPL (generally designated 400) intended which will be used in a third process of the invention for producing a large number of small displays. As described in the aforementioned U.S. Pat. Nos. 6,982,178 and 7,236,292, the sheet 400 of FPL shown in FIG. 4A comprises an essentially transparent front substrate 402 and a light-transmissive electrically-conductive layer 404, the latter forming the front electrode in the final electro-optic displays. These two layers may be formed from a commercial ITO-coated PET film. The sheet 400 further comprises an electro-optic layer 406, which may be formed of an encapsulated electrophoretic medium (although other types of solid electro-optic medium can also be employed), an adhesive layer 408 and a release sheet 410. The release sheet 410 bears on its surface a thin, electrically-conductive layer 412, which need not be transparent; as described in the aforementioned U.S. Pat. Nos. 6,982,178 and 7,236,292 and as briefly mentioned above, the conductive layer 412 permits testing of the electro-optic layer 406 in the sheet before the sheet is severed to produce individual displays.

A masking film 414 is secured to the surface of the front substrate 402 remote from the electro-optic layer 406 by an adhesive layer 416. The masking film 414 serves to protect the exposed surface of the front substrate (which will form the viewing surface of the final display) during the processing steps described below, but is removed before the display is used. In some cases, depending upon the type of front substrate used, and the processing conditions, the masking film and its associated adhesive layer may be omitted.

Figure 4B:
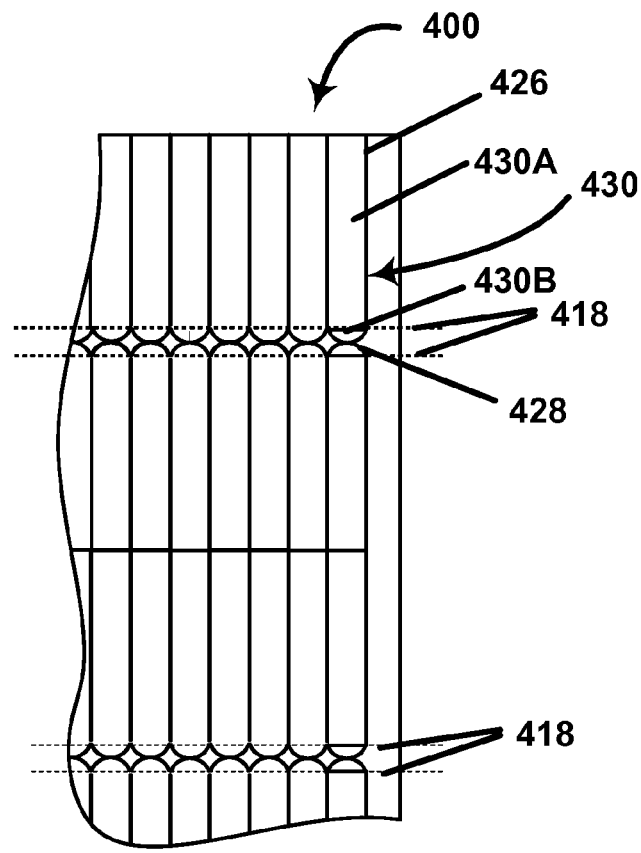
FIG. 4B is a top plan view of part of the sheet of FPL shown in FIG. 4A and illustrates the manner in which the sheet is kiss cut at an intermediate stage of the third process.
Figure 4C:
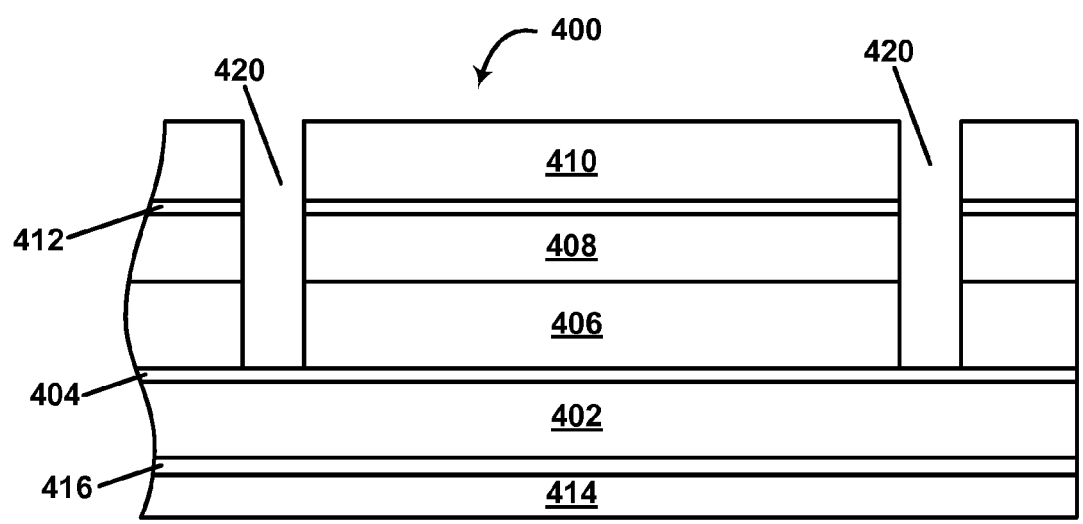
FIG. 4C is a schematic side elevation, similar to that of FIG. 4A but at the intermediate stage of the third process illustrated in FIG. 4B.

The first step in the third process of the invention is illustrated in FIGS. 4B and 4C, with FIG. 4B being a top plan view of part of the sheet 400 and FIG. 4C being a schematic side elevation similar to that of FIG. 4A. As shown in FIGS. 4B and 4C, the first step of the process is making a series of kiss cuts 418 with a laser, these cuts running parallel to the long edges of the sheet 400, and extending from the exposed surface of the release sheet 410 through the layers 410 and 412. As best seen in FIG. 4B, the kiss cuts 418 are in closely-spaced pairs; the pairs of cuts are spaced from adjacent pairs by a distance equal to twice the length of the final FPL pieces, and pairs of cuts adjacent the long edges of the sheet 400 being spaced from the edge by a distance equal to the length of the final FPL pieces. The portions of the layers 410 and 412 lying between the closely-spaced pairs of kiss cuts 418 are then removed, and the adhesive layer 408 and the electro-optic layer 406 are also mechanically removed between the closely-spaced pairs of kiss cuts 418, thus leaving a series of parallel "trenches" 420 extending across sheet 400, as best seen in FIG. 4C.

Figure 4D:
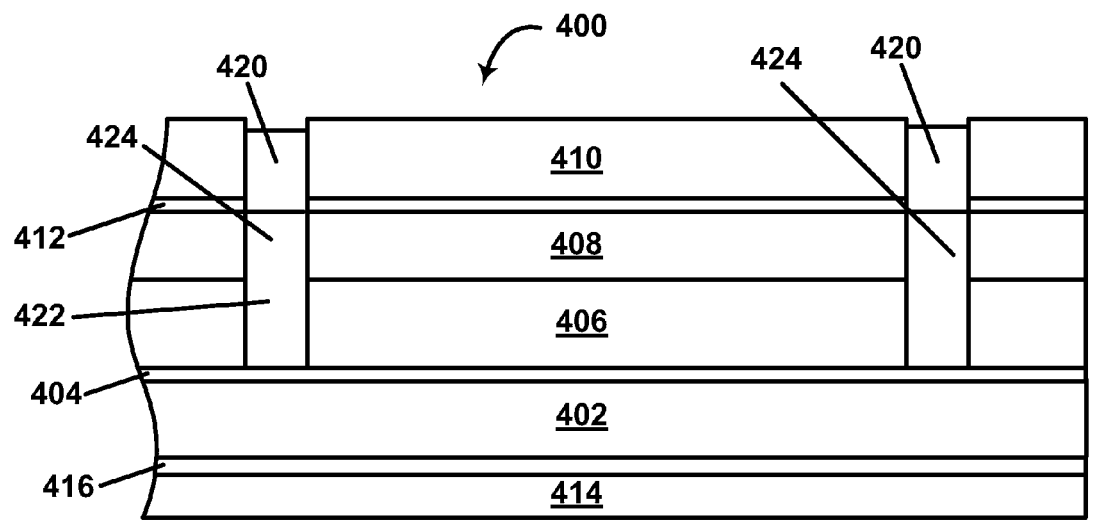
FIG. 4D is a schematic side elevation, similar to those of FIGS. 4A and 4C but at a stage of the third process later than that shown in FIG. 4C.

The next step in the process is to fill the trenches 420 with strips of conductive adhesive 422 carried on a release sheet 424, thus placing the conductive adhesive 422 in electrical contact with the conductive layer 404, as illustrated in FIG. 4D.

In the next step of the process, the sheet 400 is completely severed by laser cutting along the lines 426, 428 shown in FIG. 4B, to separate the sheet into individual FPL pieces (or components), generally designated 430. As shown in FIG. 4B, each component 430 has an elongate rectangular main section 430A, where all the layers originally present in the sheet 400 are retained, and a part-circular connection area 430B, where the release sheet 424, the conductive adhesive 422, the conductive layer 404, the transparent front substrate 402, the masking film 414 and its associated adhesive layer 416 are present.

Figure 4E:
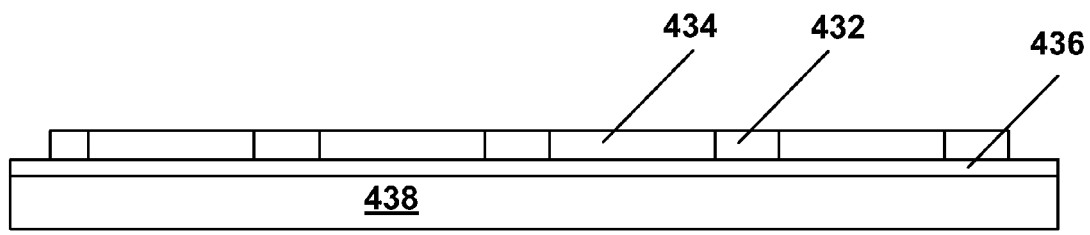
FIG. 4E is a schematic side elevation of a template used in a process for laminating multiple FPL pieces produced by the process shown in FIGS. 4A-4D to backplanes.
Figure 4F:
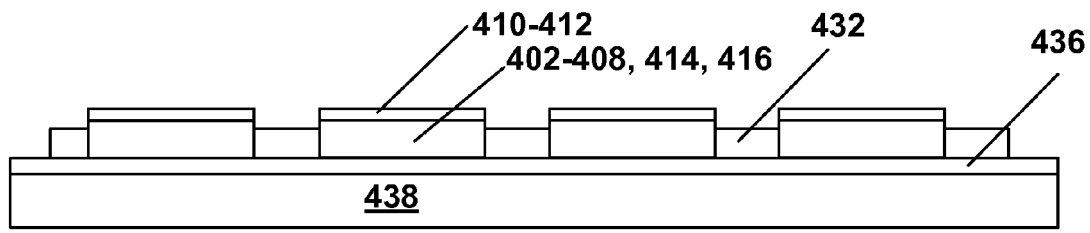
FIG. 4F is a schematic side elevation, similar to that of FIG. 4E, but showing the template with multiple FPL pieces retained therein.
Figure 4G:
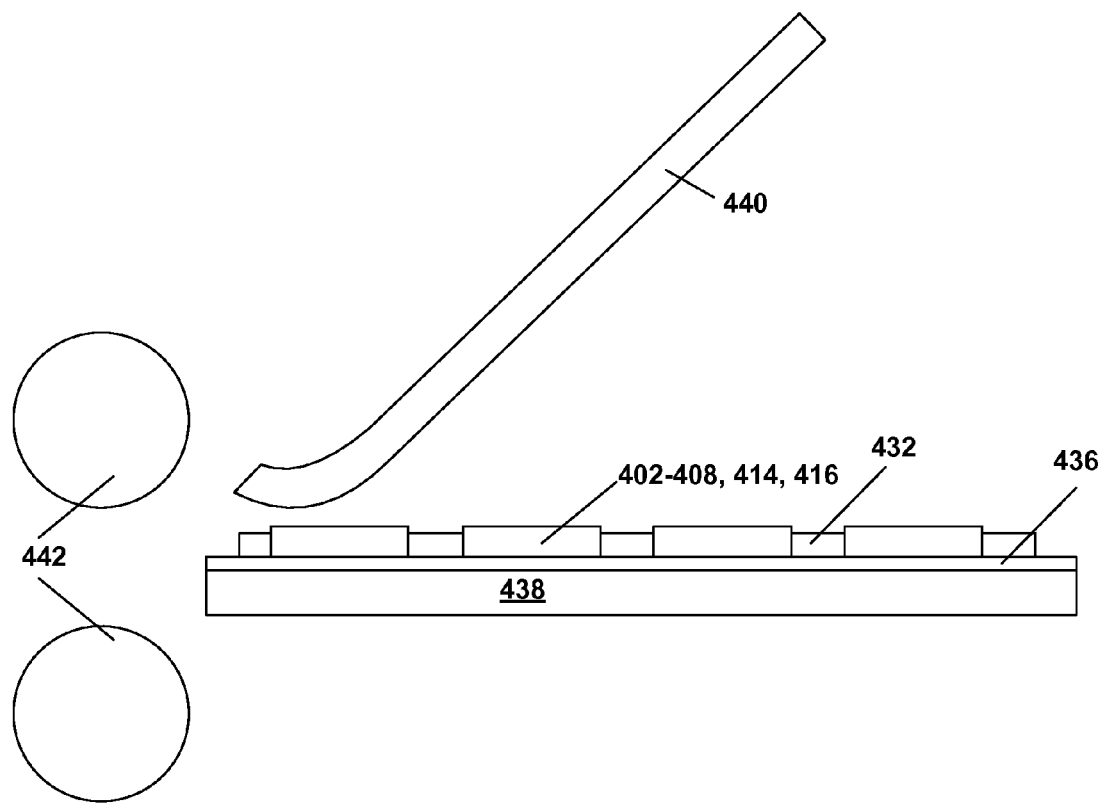
FIG. 4G is a schematic side elevation, similar to that of FIG. 4F, but showing the loaded template being laminated to a sheet comprising multiple backplanes.
Figure 4H:
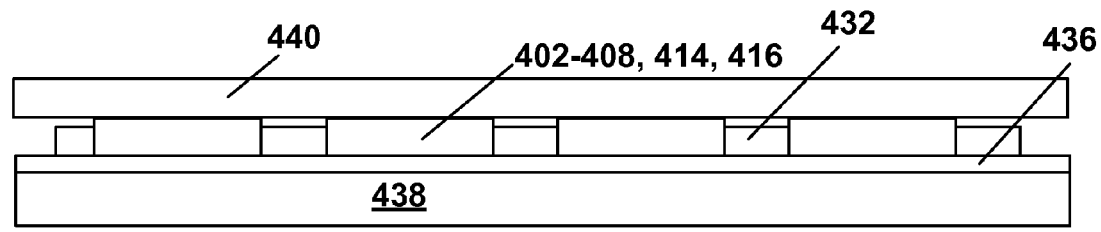
FIG. 4H is a schematic side elevation, similar to that of FIG. 4G, showing the structure produced by the lamination.

The individual FPL components 430 thus produced must now be laminated to backplanes. The first step in this lamination, illustrated in FIG. 4E, is cutting in a template 432 a series of apertures 434, each just large enough to hold one FPL component 430. A low tack adhesive film comprising an adhesive layer 436 on a base layer 438 is then adhered to the cut template 432 so that the adhesive layer 436 is exposed only within the recesses formed by the apertures 434. Next, as illustrated in FIG. 4F, the FPL components 430 are placed within the apertures 434, with the masking film 414 adhered to the adhesive layer 436, leaving the release sheet 410 exposed; note that the template 432 is made thinner than the FPL components 430. The release sheet 410 is peeled from the components 430 (the conductive layer 412 of course being removed with the release sheet 410) exposing the adhesive layer 408, and the release sheet 424 is removed from the conductive adhesive 422, thus exposing the conductive adhesive 422; the remaining layers of the FPL components 430 are still thicker than the template 432, so that the exposed adhesive layer 408 projects clear of the template 432. The filled template is then laminated to a backplane assembly 440 (FIG. 4G) which has a plurality of backplane areas, each disposed opposite one of the FPL components 430. The filled template and the backplane assembly 440 are laminated to each other using a hot roll laminator schematically indicated at 442 in FIG. 4G. The resultant display assembly of the invention is illustrated in FIG. 4H. The backplane areas of the backplane assembly 440 are arranged so that each connection area 430B (FIG. 4B) contacts a contact pad on the backplane area, thus establishing electrical contact between the contact pad and the conductive layer 404 (FIG. 4A or 4B) via the conductive adhesive 422. The next step of the process is removal of the template 432, together with the adhesive layer 436 and the base layer 438 is then peeled from the FPL components 430; to achieve this peeling, the tackiness of the adhesive layer 436 must be sufficiently low to enable the adhesive layer to be peeled from the masking film 414 without peeling the masking film from the front substrate 402.

It will be seen from FIG. 4H that the display assembly obtained by removal of the template 432, the adhesive layer 436 and the base layer 438 is a display assembly of the present invention. In practice, of course, it is usual to continue the production process by severing the backplane assembly 440 so that each FPL component 430 and its associated backplane area becomes a separate display.

Figure 5A:
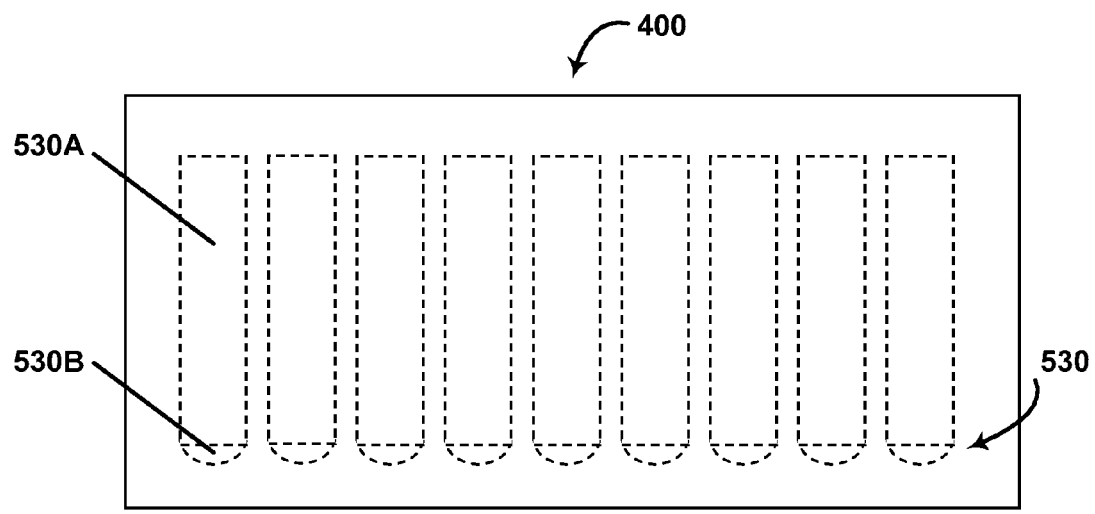
FIG. 5A is a schematic top plan view of a sheet of FPL at the first stage of a fourth process of the invention.
Figure 5B:
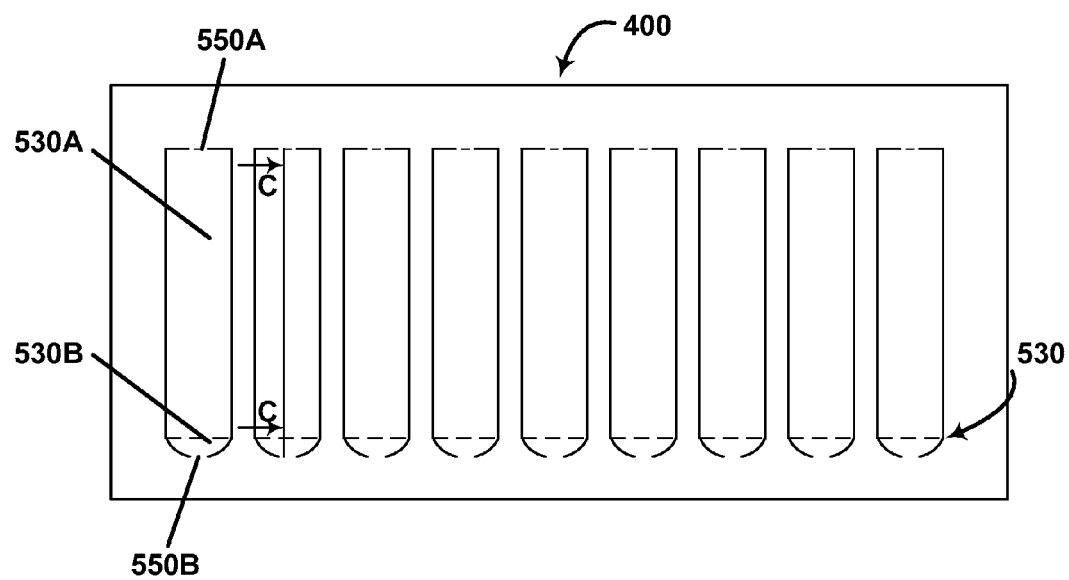
FIG. 5B is a schematic top plan view, similar to that of FIG. 5A, but at a second stage of the fourth process.
Figure 5C:
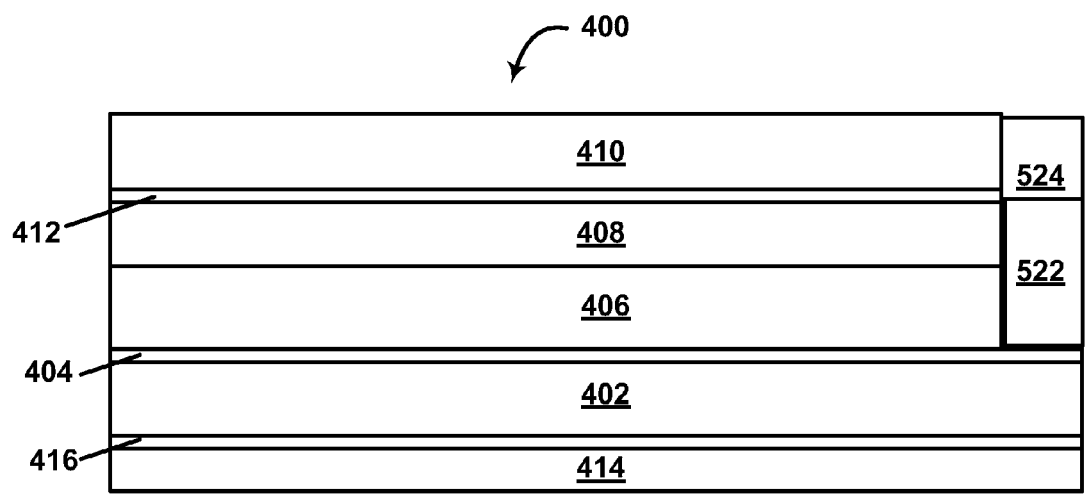
FIG. 5C is a schematic cross-section along line C-C in FIG. 5B, but at a third stage of the fourth process.

FIGS. 5A-5C illustrate a fourth process of the present invention for producing a display assembly. The process of FIGS. 5A-5C begins with a sheet 400 of FPL identical (except perhaps in size) to that used as the starting material in the third process, as described above with reference to FIG. 4A. The fourth process, however, does not use a template but laminates the entire sheet 400 to the backplane assembly, after appropriate cutting of the sheet 400 to enable post-lamination separation of the FPL components from the remaining portions of the sheet 400.

More specifically, as illustrated in FIG. 5A, the first step of the fourth process is kiss cutting (indicated by broken lines) of the release sheet 410 and the conductive layer 412 disposed thereon to define a series of spaced individual FPL pieces (or components), generally designated 530 each comprising an elongate rectangular main section 530A and a part-circular connection area 530B. Next, as illustrated in FIG. 5B, the sheet 400 is completely severed by through cuts along the periphery of the each FPL component 530, except that two small sections 550A and 550B remain uncut to hold the components 530 within the sheet 400. (The remaining broken lines in FIG. 5B indicate that only the kiss cuts through the release sheet 410 and the conductive layer 412 are present in sections 550A and 550B and along the line dividing the sections 530A and 530B of the components 530.)

In the next step of the fourth process, the release sheet 410 and the conductive layer 412 are removed from the connection areas 530B, and the underlying adhesive layer 408 and electro-optic layer 406 are mechanically cleaned to leave the conductive layer 404 exposed. The connection areas 530B are then covered (as illustrated in FIG. 5C) with pre-cut pieces of a conductive adhesive layer 522 carried on a release sheet 524.

The release sheet 410 and the conductive layer 412 are then removed from the main sections 530A and the release 524 is removed from the connection areas 530B; outside the FPL components 530, the release sheet 410 remains in position. The sheet 400 is then laminated to an appropriate backplane assembly (not shown) using a hot roll laminator in a manner exactly analogous to the lamination described with reference to FIG. 4G, except that no template is used. (The sheet 400 may of course be mounted upon a suitable support member during the lamination, and any conventional means, such as pins on the support member interacting with apertures cut in the sheet 400, may be used to align the sheet with the support member.) This lamination results in the main sections 530A of the FPL components becoming adhered to backplane areas and the connections areas 530B being in electrical contact with contact pads (not shown) via the conductive adhesive layer 522, in a manner exactly analogous to lamination described above with reference to FIG. 4G. The portion of the sheet 400 not forming part of the FPL components 530 is next peeled from the backplane assembly, with the two small sections 550A and 550B (FIG. 5B) tearing as the sheet 400 is peeled. The resulting assembly is very similar to that illustrated in FIG. 4I, and again the final step is typically severing the backplane assembly to produce a plurality of discrete displays.

Figure 4I:
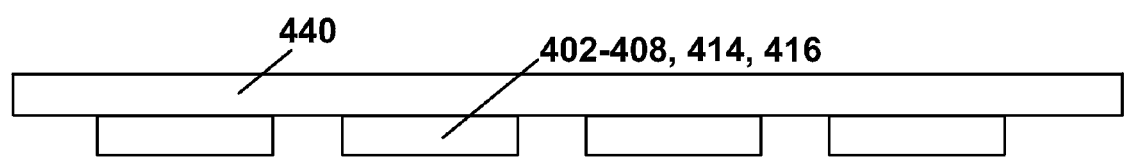
FIG. 4I is a schematic side elevation, similar to that of FIG. 4H, but showing the final structure produced by removal of the template from the structure of FIG. 4H, and prior to the severing of the structure to produce individual displays.

From the foregoing description, it will be apparent that the third and fourth processes of the invention produce the same final product, as illustrated in FIG. 4I. The choice between the third and fourth processes depends upon a number of factors, including the physical characteristics of the FPL and the size of the displays being created. For any given FPL, there will be a minimum width of gutter area in the fourth process which will permit ready peeling of the gutter area after lamination. The fourth process inevitably wastes some FPL (that present in the gutter areas), and if the displays being produced are very small, this wastage may become uneconomic. Furthermore, if the displays are very small, difficulty may be encountered in placing the conductive adhesive in the connection areas 530B in the fourth process. Accordingly, in general the third process may be better adopted for very small displays and the fourth process for larger displays.

It will be apparent from the preceding discussion that the processes of the present invention can be carried out with any electro-optic layer which has solid external surfaces to which adhesive layers and release sheets can adhere and sufficient mechanical cohesion to permit the necessary manipulation of films containing the electro-optic layer. Accordingly, the present processes can be carried out using any of the types of electro-optic media described above. For example, the present methods can make use of rotating bichromal member, electrochromic or electrophoretic media, and in the last case the electrophoretic media may be of the encapsulated, polymer-dispersed or microcell types.

Numerous changes and modifications can be made in the preferred embodiments of the present invention already described without departing from the scope of the invention. For example, the present invention may be useful with non-electrophoretic electro-optic media which exhibit behavior similar to electrophoretic media. Accordingly, the foregoing description is to be construed in an illustrative and not in a limitative sense.

The invention claimed is:

1. A display assembly comprising:
   a backplane assembly comprising a plurality of spaced backplane areas, each backplane area comprising a plurality of electrodes, the backplane areas being separated by gutter areas free from electrodes;
   an adhesive layer overlying the plurality of spaced backplane areas; and
   a layer of a solid electro-optic medium overlying the adhesive layer in the plurality of spaced backplane areas.

2. A display assembly according to claim 1 further comprising at least one of a light-transmissive electrically-conductive layer and a protective layer overlying the layer of solid electro-optic medium in the plurality of spaced backplane areas.

3. A display assembly according to claim 2 wherein a light-transmissive electrically-conductive layer overlies the layer of solid electro-optic medium in the plurality of spaced backplane areas, and a protective layer overlies the light-transmissive electrically-conductive layer in the plurality of spaced backplane areas.

4. A display assembly according to claim 3 further comprising a removable masking film overlying the protective layer in the plurality of spaced backplane areas.

5. A display assembly according to claim 2 wherein each backplane area is provided with at least one front plane contact electrode and the portion of the light-transmissive electrically-conductive layer adjacent each front plane contact electrode is essentially free of solid electro-optic material.

6. A display assembly according to claim 1 wherein the electro-optic material comprises an electrophoretic material comprising a plurality of electrically charged particles disposed in a fluid and capable of moving through the fluid under the influence of an electric field.

7. A display assembly according to claim 6 wherein the electrically charged particles and the fluid are confined within a plurality of capsules or microcells.

8. A display assembly according to claim 6 wherein the electrically charged particles and the fluid are present as a plurality of discrete droplets surrounded by a continuous phase comprising a polymeric material.

9. A sub-assembly according to claim 6 wherein the fluid is gaseous.

10. A display assembly according to claim 1 wherein the gutter areas are essentially free from both the adhesive layer and the layer of solid electro-optic medium so that both the adhesive layer and the layer of solid electro-optic material have the form of a series of discrete islands, each island overlying one of the plurality of backplane areas.

11. A display assembly according to claim 10 further comprising a substrate disposed on the opposed side of the adhesive layer and the layer of solid electro-optic medium from the backplane assembly, and adhering to all the islands of the layer of solid electro-optic material.

12. A display assembly according to claim 1 wherein the adhesive layer and the layer of solid electro-optic material extend across the gutter areas, the adhesive layer and the layer of solid electro-optic material being at least partially severed along the peripheries of the gutter areas, such that the portions of the adhesive layer and the layer of solid electro-optic material overlying the gutter areas can be removed from the gutter areas without removing the portions of the adhesive layer and the layer of solid electro-optic material overlying the backplane areas.

13. A process for forming a display assembly according to claim 12, the process comprising:
   forming an electro-optic sheet comprising, in this order, a layer of solid electro-optic material, an adhesive layer, and a release sheet;
   partially severing the electro-optic sheet to define a plurality of discrete components separated from each other by gutter areas, the layer of solid electro-optic material, adhesive layer, and release sheet being severed along at least the major portion of the periphery of each component;
   removing the release sheet from the adhesive layer in the plurality of discrete components but leaving the release sheet in contact with the adhesive layer in the gutter areas; and
   contacting the electro-optic sheet with a backplane assembly comprising a plurality of spaced backplane areas, each backplane area comprising a plurality of electrodes, the contacting being effected such that each component becomes aligned with one of the spaced backplane areas under conditions effective to cause the plurality of components to adhere to the backplane areas of the backplane assembly, thereby producing a display assembly according to claim 12.

14. A process according to claim 13 further comprising removing the layer of solid electro-optic material, adhesive layer, and release sheet from the gutter areas.

15. A process according to claim 14 further comprising severing the backplane assembly after removal of the layer of solid electro-optic material, adhesive layer, and release sheet from the gutter areas, thereby separating the plurality of backplane areas from one another and forming a plurality of discrete electro-optic displays.

16. A process according to claim 13 wherein the electro-optic sheet further comprises at least one of a light-transmissive electrically-conductive layer and a protective layer on the opposed side of the layer of solid electro-optic medium from the adhesive layer.

17. A process according to claim 16 wherein the electro-optic sheet each backplane area is provided with at least one front plane contact electrode and, prior to the contacting of the electro-optic sheet with the backplane assembly, the layer of electro-optic material is removed from the portion of the light-transmissive electrically-conductive layer which will lie adjacent each front plane contact electrode.

18. A process for forming a display assembly according to claim 1, the process comprising:
forming a plurality of components, each component comprising a layer of solid electro-optic material and an adhesive layer;
disposing the plurality of components on a support surface, the components being spaced from each other, with the adhesive layer facing away from the support surface; and
contacting the disposed plurality of components with a backplane assembly comprising a plurality of spaced backplane areas, each backplane area comprising a plurality of electrodes, the backplane areas being separated by gutter areas free from electrodes, the contacting being effected under conditions effective to cause the plurality of components to adhere to the backplane areas of the backplane assembly.

19. A process according to claim 18 wherein the support surface comprises a template having a plurality of recesses within which the components are received.

20. A process according to claim 18 wherein at least part of the surface of the substrate is tacky, the tacky surface of the substrate serving to hold the components in fixed positions on the substrate during the contacting of the components with the backplane assembly.

21. A process according to claim 18 wherein each component further comprises a release layer on the opposed side of the adhesive layer from the layer of solid electro-optic material, and wherein the release layer is removed from the components after the components have been placed on the substrate but before the components are contacted with the backplane assembly.

22. A process according to claim 18 wherein each component further comprises at least one of a light-transmissive electrically-conductive layer and a protective layer on the opposed side of the layer of solid electro-optic medium from the adhesive layer.

23. A process according to claim 22 wherein each backplane area is provided with at least one front plane contact electrode and the portion of the light-transmissive electrically-conductive layer of each component adjacent each front plane contact electrode is essentially free of solid electro-optic material.

24. A process according to claim 18 further comprising removing the support surface from the components after the components are adhered to the backplane areas of the backplane assembly.

25. A process according to claim 18 further comprising severing the backplane assembly after the components are adhered thereto, thereby separating the plurality of backplane areas from one another and forming a plurality of discrete electro-optic displays.

* * * * *